(12) United States Patent
Trotter

(10) Patent No.: US 11,542,742 B2
(45) Date of Patent: ***Jan. 3, 2023

(54) AERIAL FIREFIGHTING DUMP GATE SYSTEM

(71) Applicant: Victor D. Trotter, Fort Worth, TX (US)

(72) Inventor: Victor D. Trotter, Fort Worth, TX (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/202,577

(22) Filed: Mar. 16, 2021

(65) Prior Publication Data

US 2021/0198934 A1 Jul. 1, 2021

Related U.S. Application Data

(63) Continuation-in-part of application No. 16/030,147, filed on Jul. 9, 2018, now Pat. No. 11,046,433.

(51) Int. Cl.
*E05F 15/00* (2015.01)
*E05F 15/63* (2015.01)
(Continued)

(52) U.S. Cl.
CPC .......... *E05F 15/63* (2015.01); *A62C 3/0235* (2013.01); *B64D 1/16* (2013.01); *E05F 11/02* (2013.01); *E05Y 2201/216* (2013.01); *E05Y 2201/434* (2013.01); *E05Y 2201/624* (2013.01); *E05Y 2201/676* (2013.01); *E05Y 2201/716* (2013.01);
(Continued)

(58) Field of Classification Search
CPC .... E05F 15/63; E05F 11/02; E05Y 2201/216; E05Y 2201/434; E05Y 2201/624; E05Y 2201/676; E05Y 2201/716; E05Y 2201/722; E05Y 2400/354; E05Y 2900/502; F16D 11/14; F16H 1/22; A62C 3/0235; A62C 3/0242; A62C 3/0228;
(Continued)

(56) References Cited

U.S. PATENT DOCUMENTS

| 4,913,398 A | 4/1990 | Ziaylek, Jr. et al. |
| 4,936,389 A ‡ | 6/1990 | MacDonald ............. B64D 1/16 137/39 |

(Continued)

OTHER PUBLICATIONS

WIPO International Search Report dated Sep. 9, 2019 in PCT Application No. PCT/US19/39693.‡

*Primary Examiner* — Chi Q Nguyen

(74) *Attorney, Agent, or Firm* — Dan Brown Law Office; Daniel R. Brown

(57) ABSTRACT

A gatebox system for delivering fire retardant fluid from a firefighting aircraft. A first and second gate opening are formed through a lower portion of a gatebox. The gates are hingedly connected along edges of the openings. One or two drive shafts in the gatebox are rotatable in gates-closing and gates-opening directions. Crank arms are fixed to the drive shafts and coupled to the gates by connecting links, which define an over-center geometry while the gates are at a closed position, such that weight of the fluid on the first gate induces torque on the drive shaft in the gates-closing direction. Rotation of the drive shafts in the gates-opening direction enables control of the fluid flow from the hopper according to an angular position of the drive shaft.

20 Claims, 13 Drawing Sheets

(51) Int. Cl.
  *B64D 1/16* (2006.01)
  *E05F 11/02* (2006.01)
  *A62C 3/02* (2006.01)
  *F16D 11/14* (2006.01)
  *F16H 1/22* (2006.01)

(52) U.S. Cl.
  CPC ... *E05Y 2201/722* (2013.01); *E05Y 2400/354* (2013.01); *E05Y 2900/502* (2013.01); *F16D 11/14* (2013.01); *F16H 1/22* (2013.01)

(58) Field of Classification Search
  CPC .......... A62C 37/04; A62C 37/00; B64D 1/16; B64D 1/18
  USPC ....... 49/7; 169/53, 51, 60, 47; 244/131, 136; 137/393, 412, 395; 222/67, 575
  See application file for complete search history.

(56) References Cited

U.S. PATENT DOCUMENTS

| | | | | |
|---|---|---|---|---|
| 5,279,481 | A ‡ | 1/1994 | Trotter | G05D 7/0635 169/53 |
| 5,326,053 | A * | 7/1994 | Pahl | B64D 1/16 169/53 |
| 5,967,462 | A ‡ | 10/1999 | Foster | B64D 1/16 244/10 |
| 7,182,145 | B2 | 2/2007 | Powers et al. | |
| 8,365,762 | B1 ‡ | 2/2013 | Trotter | B64D 1/18 137/48 |
| 8,579,234 | B2 ‡ | 11/2013 | Thompson | B64D 1/18 244/136 |
| 8,640,782 | B2 ‡ | 2/2014 | Parker | A62C 3/0228 169/53 |
| 9,617,000 | B2 * | 4/2017 | Thompson | A01C 7/085 |
| 10,196,145 | B2 ‡ | 2/2019 | Thompson | B66F 5/00 |
| 10,273,003 | B2 * | 4/2019 | Coulson | A62C 3/0242 |
| 11,046,433 | B2 * | 6/2021 | Trotter | B64D 1/16 |
| 2002/0084383 | A1 ‡ | 7/2002 | Maeda | B64D 1/16 244/136 |
| 2012/0248248 | A1 ‡ | 10/2012 | Thompson | B64D 1/00 244/130 |
| 2013/0199804 | A1 * | 8/2013 | Parker | A62C 37/04 169/53 |
| 2014/0367128 | A1 ‡ | 12/2014 | Parker | B64D 1/16 169/53 |
| 2022/0024587 | A1 * | 1/2022 | Trotter | B64D 1/16 |

\* cited by examiner
‡ imported from a related application

Closed Gate

Just Open
Out of Phase

Fully Open

Inactive

Release Clutch

Pull Drive
Over-Center

AERIAL FIREFIGHTING DUMP GATE SYSTEM

BACKGROUND OF THE INVENTION

References to Related Applications

This is a continuation in part of application Ser. No. 16/030,147 filed on Jul. 9, 2018, now U.S. Pat. No. 11,046,433.

FIELD OF THE INVENTION

The present invention relates to firefighting aircraft fire retardant dump gates.

DESCRIPTION OF THE RELATED ART

Firefighting aircraft, also referred to as air tankers, carry a volume of fire retardant, such as water or other chemicals, which are dumped onto designated areas for fire control operations. The fire retardant is carried in a tank or hopper within the aircraft and is released through the use of a dump gate. The release and targeting of the fire retardant is a critical operation due to the necessarily limited volume of fire retardant available on a given aircraft and the generally large areas of fire being attacked. Targeting calculations involve the air speed, altitude, wind speed, rate of climb/descent, volume of fire retardant to be dispersed, length and width of a predetermined target area, and the rate at which the fire retardant is dumped from the dump gate. As such, control of the dump gate opening and rate of flow are critical for targeting purposes.

U.S. Pat. No. 8,365,762, issued on Feb. 5, 2013 to Trotter, who is an inventor of the present disclosure, teaches a hydraulic control system used to operate a dump gate in a firefighting aircraft. In that design, hydraulics are advantageously employed because of their reliability, their ability to apply substantial forces to a pair of gates, and their ability to firmly and quickly control the position of the dump gates. A feedback control system was employed to provide precise position control of the gates. This system has a record of proven performance in certain models of firefighting aircraft from Air Tractors, Inc. (Olny, Tex.), including the AT-802F "Fire Boss" aircraft.

While hydraulics have been successfully employed for dump gate operation, hydraulics do carry certain liabilities. The hydraulic pump, actuators, reservoir, pipes and fittings are relatively heavy components, which weight must be deducted from the fire retardant payload. Hydraulics also introduce a new dynamic system in an aircraft, which also carries existing dynamic systems, such as the aircraft electric generators and storage batteries, and which might be more fully taken advantage of Hydraulics also create maintenance issues and potentials for leaking and other reliability issues. Thus, it can be appreciated that there is a need in the art for an improved dump gate and control system that addresses the problems in the prior art.

SUMMARY OF THE INVENTION

The need in the art is addressed by the systems as taught by the present invention. The present disclosure teaches a gatebox system for a hopper that contains fluid in a firefighting aircraft. The gatebox system includes a box assembly with an upper portion adapted to receive the fluid from the hopper, and a first gate opening and a second gate opening formed through a lower portion of the gatebox. A first gate is hingedly connected along an edge of the first gate opening, and a second gate is hingedly connected along an edge of the second gate opening. A drive shaft is supported within the box assembly and is rotatable in a gates-closing direction and a gates-opening direction. A first crank arm is fixed to the drive shaft and coupled to the first gate by a first connecting link, which defines an over-center geometry while the first gate is at a closed position, such that weight of the fluid on the first gate induces torque on the drive shaft in the gates-closing direction. Similarly, a second crank arm is fixed to the drive shaft and coupled to the second gate by a second connecting link, which define an over-center geometry while the second gate is at a closed position such that weight of the fluid on the second gate induces torque on the drive shaft in the gates-closing direction. And wherein, rotation of the drive shaft in the gates-opening direction is coupled to the first and second gates by the first and second crank arms and the first and second connecting links to open the first and second gates, to thereby enable control of the fluid flow from the hopper according to an angular position of the drive shaft.

In a specific embodiment of the foregoing gatebox system, the first and second connecting links engage the drive shaft while the first and second gates are at the closed positions to thereby prevent over-rotation of the drive shaft in the gates-closing direction. In another specific embodiment, the first crank arm and the first connecting link further comprise plural crank arms and plural connecting links disposed between the drive shaft and the first gate, and the second crank arm and the second connecting link further comprise plural crank arms and plural connecting links disposed between the drive shaft and the second gate.

In a specific embodiment of the foregoing gatebox system, the first and second crank arms and the first and second connecting links are configured with a geometry whereby the first gate and the second gates open out of phase with one another as the drive shaft is rotated in the gate-opening direction.

In a specific embodiment, the foregoing gatebox system further includes an electric motor driving a gear reduction drive coupled to rotate the drive shaft in both of the gates-opening and gates-closing directions. In a refinement to this embodiment, the gear reduction drive comprises a clutch operable to disconnect the drive shaft from the electric motor.

In a specific embodiment, the foregoing gatebox system further includes a servo-motor coupled to drive the drive shaft in either of the gates-opening or gates-closing directions. In a refinement to this embodiment, the gatebox system further includes a control system coupled to the servo-motor to control the angular position of the drive shaft, and thereby control of the flow of fluid through the first and second gates.

In a specific embodiment, the foregoing gatebox system further includes a position sensor coupled to the drive shaft that outputs a gate position signal to the control system, and a current sensor couple to the servo motor that outputs a motor current signal to the control system, and wherein the control system defines a gates-closed position of the first and second gates when the position signal indicates a closed condition and the motor current signal exceeds a predetermined current threshold. In a further refinement to this embodiment, the control system controls the flow of fluid from the first and second gates by counting the number of revolutions of the servo-motor.

In a specific embodiment of the foregoing gatebox system, wherein the gatebox is installed in an aircraft having plural aircraft batteries connected in parallel, the gatebox system further includes a motor power supply having a switching circuit connected to the plural aircraft batteries, which operates to switch the plural aircraft batteries into a series circuit to thereby increase the voltage available to drive the servo-motor.

In a specific embodiment of the foregoing gatebox system, wherein the gatebox is installed in an aircraft having an aircraft power supply providing a first voltage, the gatebox system further includes a motor power supply coupled to the servo-motor, and a battery connected in series with the aircraft power supply to thereby provide a drive voltage to the servo-motor that is greater than the first voltage.

In a specific embodiment, the foregoing gatebox system further includes an electric motor and a gear reduction drive coupled between the motor and the drive shaft to rotate the drive shaft in either of the gates-opening and gates-closing directions under motive force of the motor, and a clutch coupled to selectively disconnect the drive shaft from the electric motor, and a manual actuator coupled to the clutch to selectively disconnect the motor from the drive shaft, and thereby enable the first and second gates to open without use of the motor.

In a refinement to the foregoing embodiment, the gatebox system further includes a clutch linkage disposed between the manual actuator and the clutch, and the clutch linkage is coupled to the drive shaft through a shaft crank arm, and actuation of the manual actuator applies rotational force to the drive shaft, through the shaft crank arm, in the gates-opening direction, to thereby rotate the drive shaft past the over-center condition to enable the first and second gates to fall open under force of gravity.

In a further refinement to the foregoing embodiment, the clutch linkage is configured to disengage the clutch prior to applying rotational force to the drive shaft. In another refinement, the gatebox system further includes an interlock coupled between the clutch linkage and the motor, that operates to disable electric power to the motor upon actuation of the manual actuator.

The present disclosure teaches a gatebox system for a hopper that contains fluid in a firefighting aircraft, which includes a box assembly that receives the fluid from the hopper, and has first and second gate openings formed through a lower portion thereof, and first and second gates hingedly connected along edges of the gates. First and second drive shafts are rotatably supported within the box assembly, and, first and second cranks arm are fixed to the first and second drive shafts, respectively, and are coupled to the first and second gates by first and second connecting links. A shaft synchronizer engages the first and second drive shafts to synchronize their rotation in respective gate-opening and gate-closing directions, and the shaft synchronizer has an input coupler. An electric motor is coupled to urge rotation of the input, and rotation of the input coupler induces synchronized rotation, through the shaft synchronizer, of both of the first and second drive shafts in the respective gates-opening and gates-closing directions, which are thereby coupled to the first and second gates by the first and second crank arms and the first and second connecting links to open and close the first and second gates, and to thereby enable control of the fluid flow from the hopper according to angular positions of the input coupler.

In a specific embodiment of the foregoing gatebox system, the first first and second crank arms and the first a second connecting links are arranged to define an over-center geometry while the first and second gates are at closed positions, such that weight of the fluid on the first and second gates induces torque on the first and second drive shafts in the respective gates-closing directions.

In a specific embodiment of the foregoing gatebox system, the input coupler includes a portion of the first drive shaft, and the motor is coupled to the portion of the first drive shaft.

In a specific embodiment of the foregoing gatebox system, the shaft synchronizer includes first and second gears meshingly engaged with one another, and each is coupled to the first or second drive shafts, respectively.

In a specific embodiment of the foregoing gatebox system, the shaft synchronizer comprises drive components selected from; a pair of meshed gears, a pair of sheaves coupled with a timing belt, a pair of sprockets coupled by a roller chain, a pair of gears coupled by a geared rack, and a pair of crank arms coupled by a connecting link.

In a specific embodiment of the foregoing gatebox system, the first and second connecting links engage the first and second drive shafts while the first and second gates are at the closed positions to thereby prevent over-rotation of the first and second drive shafts in the respective gates-closing directions.

In a specific embodiment of the foregoing gatebox system, the first crank arm and the first connecting link further comprise plural crank arms and plural connecting links disposed between the first drive shaft and the first gate, and the second crank arm and the second connecting link further comprise plural crank arms and plural connecting links disposed between the second drive shaft and the second gate.

In a specific embodiment of the foregoing gatebox system, the first and second crank arms and the first and second connecting links are configured with a geometry such that the first gate and the second gate open out of phase with one another as the first and second drive shafts are rotated in the gate-opening direction.

In a specific embodiment, the foregoing gatebox system further includes a transmission coupled between the electric motor and the input coupler, to thereby increase the available torque to drive the first and second drive shafts in both of the respective gates-opening and gates-closing directions.

In a specific embodiment of the foregoing gatebox system, the transmission includes a clutch operable to disconnect the input coupler therefrom.

In a specific embodiment, the the foregoing gatebox system further includes a servo-motor connected to a servo-motor controller, and coupled to the input coupler to thereby drive the first and second drive shafts in either of the respective gates-opening or gates-closing directions. In a refinement to this embodiment, the servo-motor is electrically arranged to function as a generator when driven by forced applied to the gates, to thereby deliver regenerative electrical power back into said servo-motor controller. In anther refinement to this embodiment, a manual OPEN and CLOSE actuator is coupled to the servo-motor controller, to enable manually selectable operation of the gates between open and closed positions. In another refinement to this embodiment, the gatebox system further includes a control system coupled to the servo-motor to control the angular positions of the first and second drive shafts, and thereby control of the flow of fluid through the first and second gates. In a further refinement, the gatebox system includes a position sensor coupled to the input coupler that outputs a gate position signal to the control system, and a current sensor coupled to the servo motor that outputs a motor current signal to the control system, and wherein the control system defines a gates-closed position of the first and second gates when the position signal indicates a closed condition and the motor current signal exceeds a predetermined current threshold. In yet another refinement, the control system controls the flow of fluid from the first and second gates by counting the number of revolutions of the servo-motor.

In a specific embodiment, the foregoing gatebox system further includes a transmission coupled between the electric motor and the input coupler to thereby rotate the first and second drive shafts in either of the respective gates-opening and gates-closing directions under motive force of the motors and, a clutch coupled to selectively disconnect the transmission from the input coupler, and a manual actuator coupled to the clutch to selectively disconnect the transmission from the input coupler, and thereby enable the first and second gates to open without use of the motor. In a refinement to this embodiment, the gatebox system further includes a clutch linkage disposed between the manual actuator and the clutch, and, the clutch linkage is coupled to the input coupler through a shaft crank arm, such that actuation of the manual actuator applies rotational force to the input coupler, through the shaft crank arm, in the gates-opening directions, to thereby rotate the first and second drive shafts past their the respective over-center conditions to enable the first and second gates to fall open under force of gravity. In another refinement, the clutch linkage is configured to disengage the clutch prior to applying rotational force to the input coupler. In yet another refinement, t3h gatebox further includes an interlock coupled between the clutch linkage and the motor, and operable to disable electric power to the motor upon actuation of the manual actuator.

DESCRIPTION OF THE INVENTION

Figure 1:
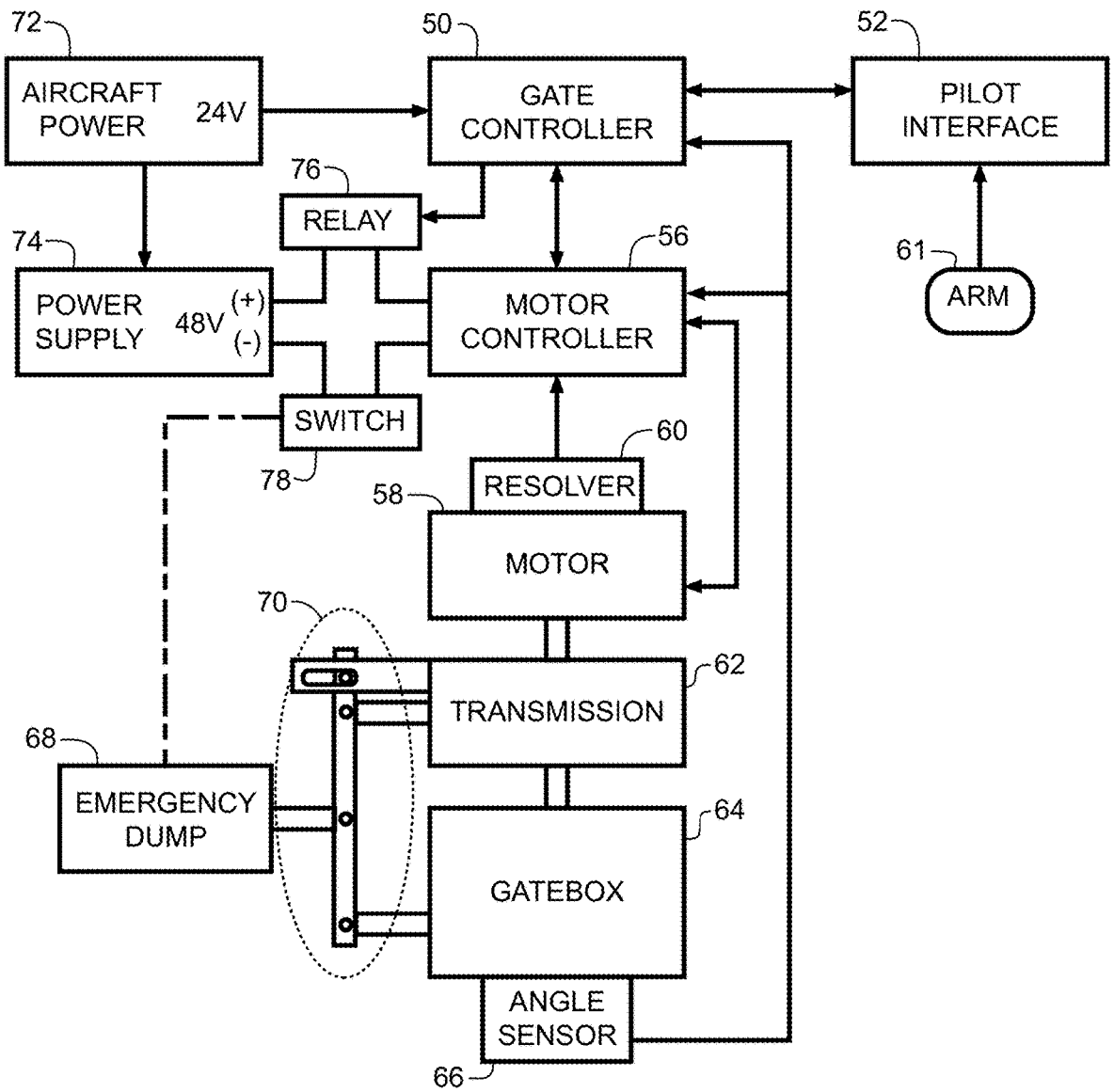
FIG. 1 is a functional block diagram of a fire retardant delivery system according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various compositions, apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

In an illustrative embodiment of the present disclosure, the Air Tractor 802F fire fighting aircraft is the host for the gatebox assembly together with its related control equipment. This is also referred to as a "firegate." Functionally speaking, the gatebox is the discharge valve system used to dispense fire retardant from the aircraft, and plays a critical role in the efficient utilization of the limited quantity of fire retardant available in any given drop flight. The Air Tractor 802F is a single engine air tanker with an 800 gallon payload that is purpose built for aerial firefighting. The aircraft drops the payload through an opening in the belly of the fuselage. This disclosure contemplates improvement to the prior art gatebox systems, which is commercially referred to as the third generation fire retardant drop system, ("GEN III FRDS"). The present disclosure presents an electrically driven mechanical gate system, together with an electrical system, which controls the position of the gate doors to meter the flow of fire retardant from the AT-802F fire retardant hoppers. Long term retardant and other liquid payloads may be used in the hoppers as necessary for various firefighting missions.

A typical fire retardant release takes a minimum of approximately one-half second, and up to a maximum of about 10 seconds depending on gate controller settings, which dynamically control the firegate opening size and duration. The controller has an interface module located in the cockpit while all other electronic equipment is mounted outside of the cockpit. Reference is directed to FIG. 1, for an introduction of the system components. The gatebox 64 and control system components include multiple electrical boxes to perform various functions and a mechanical gate system with moving doors coupled to an actuator. All components are protected by circuit breakers of appropriate size. The primary components include a pilot interface 52, a gate controller 50, a motor controller 56, an electric motor 58, a gatebox 64, a transmission 62, and an emergency dump system 68, 70. In addition, there is a power supply 74 that interfaces with the aircraft power system 72.

Figure 2:
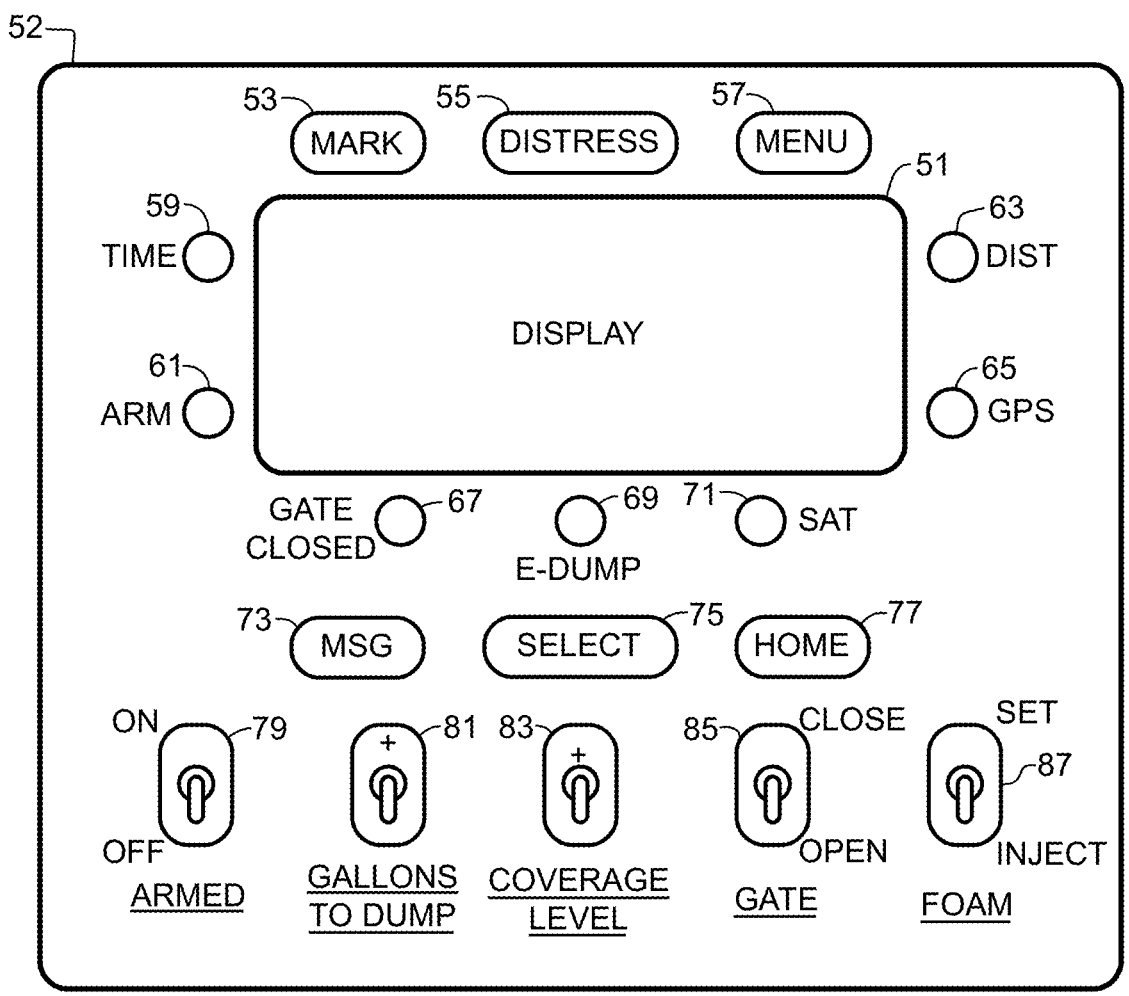
FIG. 2 is a drawing of a pilot interface according to an illustrative embodiment of the present invention.

The pilot interface 52 is powered by the gate controller 50 and is the means by which various system settings are primarily controlled. Now referring to FIG. 2, the pilot interface 52 consists of a display module 51 and various switches and indicators. The display module 51 is in an aluminum case with a silicone membrane type keypad. The LCD display 51 is mounted behind a sealed piece of glass. The pilot interface 52 provides messages and system status to the pilot, and accepts inputs from plural actuators 53, 55, 57, 73, 75, 77, 79, 81, 83, 85, and 87 and one push button/rotary encoder. Plural indicating lamps are also provided; 59, 61, 63, 65, 67, 69, and 71.

The pilot interface 52 push buttons include a Mark button 53, which is used for telemetry system only, and defines points of interest. A Distress button 55 is also used for the telemetry system only, and activates transmission of a distress signal. A Menu button 57 enters and exits controller menus operations. A Home button 77 returns the display 51 to a home screen. A MSG (Message) button 73 is also used for the telemetry system only, and receives text messages sent to the unit. A Select actuator 75 is a scroll and select device used to access menu options present on the display 51.

The pilot interface 52 also comprises indicator lamps, including a time mode status lamp 59, which is related to GPS tracking intervals. It also includes an ARMED status indicator 61, which will be more fully discussed hereinafter. It also includes an emergency dump (E-DUMP) system status indicator lamp 69, which will also be more fully discussed hereinafter. It also includes a satellite modem (SAT) connectivity status indicator 71, which is related to telemetry functions. It also includes a GPS connectivity indicator 65, which is also related to gate and telemetry functions. It also includes a distance mode (DIST) status indicator 63, which is related to GPS tracking intervals.

The pilot interface 52 also includes plural toggle switches below the display area, as follows. An ARMED switch 79, which is turned on to arm the system prior to dumping fire retardant through the gatebox. There is also a Gallons To Dump switch 81, which enables the pilot to adjust the volume of fire retardant to be dumped. There is also a Coverage Level switch 83, which enables the pilot to set the fire retardant cover level of each dump. There is a also a Gate Open/Close switch 85, which enables the pilot to drive the gates open or closed, and is also used to calibrate the closed position setting. Finally, there is a FOAM switch 87, which allows for injecting foam into the system.

Now referring back to FIG. 1, the gate controller 50 is the main control box for the system, and provides the following function. The gate controller 50 accepts inputs from the pilot interface 52, thereby enabling the pilot to set system parameters. The gate controller 50 connects to the various feedback devices such as sensors and switches. The gate controller 50 provides the microprocessors used to control logic functions for the system. The gate controller 50 performs calculations for the requisite gate angle to meet targeted drop rates based on sensor inputs. The gate controller 50 provides feedback to the motor controller 56. The gate controller 50 performs passive diagnostics and system self-tests. The gate controller 50 provides power and signals to the pilot interface 52. The gate controller 50 contains an accelerometer to sense the acceleration of the aircraft. The gate controller 50 provides Automated Flight Following (AFF) and Additional Telemetry Unit (ATU) functions. The gate controller 50 records and transmits firefighting event data via cellular or satellite modems. The gate controller 50 contains a GPS module to determine location of aircraft.

Continuing in FIG. 1, the motor controller 56 processes commands from the gate controller 50 and communicates them to the electric motor 58. The motor controller 56 also converts the 24 volt (nominal) aircraft bus power to three-phase AC power required to drive the electric motor, which is a three-phase rotating-field motor with a permanent magnet rotor. In other embodiments, a 48 volt (nominal) power supply is employed to yield higher motor torque and power ratings. The motor controller may also maintain a motor shaft position and rotation count by reading an optional resolver 60 that rotates together with the motor 58. Other sensor technologies could be employed for the resolver function including incremental encoders, absolute encoders, rotary and linear potentiometers, linear LVDT or potentiometers with a crack arm, as are known to those skilled in the art. In the illustrative embodiment, the motor is a Heinzmann GmbH (www.heinzmann.com) model PMS 100 series permanent magnet synchronous motor.

Note that the gate controller 50 further includes an internal supervisor circuit to provides redundancy by providing a discrete input signal to the motor controller 56 to open the gates if a normal drop command does not initiate gate movement within 0.8 seconds. This supervisor circuit is hardware driven and requires no software within the gate controller 50 to command the motor controller 56. It should be noted that as the gate box 64 opens the gates (not shown) the weight of the fire retardant therein urges the gates to open with a substantial amount of force. This force is coupled through the transmission 62 and into the motor 62, urging it to rotate more quickly. As such, the motor must act as a brake against an overly-rapid and uncontrolled gate opening. Or, some sort of mechanical brake may be required. In an illustrative embodiment, the motor 58 and motor controller 56 provide a regenerative braking action whereby that force is converted to electric current in the motor 56, which is back fed into the power supply 74, comprising the batteries (not shown). As such, regenerative braking is realized and the batteries are somewhat recharged during the fire retardant dump process. This offsets the electric power demand placed on the aircraft by the system of the present disclosure.

The gatebox system, as generally depicted in FIG. 1, includes a number of system sensors that provide parametric inputs to the gate controller 50. A hopper volume sensor (not shown) outputs a voltage proportional to the rotary position of a hopper float shaft. The gate controller 50 calculates the gallons in the hopper based on this voltage for use during drops and for display to the pilot and ground loading crew. This sensor is mounted onto the rear hopper of the aircraft. A gatebox angle sensor 66 outputs an analog voltage that is proportional to the rotary position of the gate drive shaft (discussed hereinafter). The gate controller 50 uses this signal when controlling the gatebox gate angle in normal mode only. In an alternative embodiment, a linear sensor (not shown) may be employed, which measures the gate opening directly, and which is also couple to the Gate Controller 50. When either of the angle sensor 66 or the linear sensor are employed, the use of the resolver 60 is options. This is because where the gate position is measure, it is not essential to keep track of the motor's annular position for the detection of gate positions. These two approaches represent two options available to the designer.

An accelerometer (not shown) is provided within the gate controller 50, and provides the control system with a voltage proportional to the acceleration of the aircraft. This is used by the controller for flow rate and door angle calculations in normal mode only. In addition, a Hall effect sensor (not shown) is internal to the motor and outputs a signal to the motor controller 56 for position feedback control. A temperature sensor (not shown) also provides the motor controller 56 with the internal temperature of the motor, which can be used for diagnostics. Both sensor signals exit the motor 58 through a common cable for connection to the motor controller 56.

Continuing in FIG. 1, the electric motor 58 is an AC powered servo-motor, which is used to open and close the gatebox gates. This motor 58 is controlled by the gate controller 50 through the motor controller 56 during normal system operation to precisely control the angle of the gatebox 64 gates (not shown) to achieve constant flow out of the aircraft hoppers (not shown). The motor 58 is coupled to a drive shaft (not shown) in the gatebox 64 by a splined connection to a transmission 62, which comprises a gear reduction therein. The transmission 62 reduces the motor 58 shaft speed to achieve an appropriate output speed. The transmission 62 also multiples the motor's 58 output torque in order to provide sufficient torque to open and close the gates (not shown). Note that the motor controller 56 converts DC input power to a variable frequency and current three-phase AC power to the motor to achieve control.

The primary source of power in FIG. 1 is the aircraft power bus 72, which typically provides 24 volts DC nominal power to the gate controller 50. In some embodiments, the motor controller 56 may be selected to operate on 24 volts. However, in other embodiments, the motor controller 56 is selected to operate on 48 volts DC (nominal). The higher voltage enables the use of motors with higher power and torque ratings. In order to provide a motor controller input voltage greater than the aircraft power bus 72 voltage, and power supply 74 is added, which provides the increased voltage. Details and options for achieving this increased voltage will be more fully discussed hereinafter.

In the event of a complete failure of the gatebox system of FIG. 1, it is necessary to provide an emergency dump system for safety reasons. This is achieved with an emergency dump actuator 68 that is coupled to the electrical system through a switch 78, and to the transmission 62 and gatebox 64 using a mechanical linkage 70. The transmission 62 includes a clutch (not shown) that disengages the motor 58 from the gatebox 64 upon actuation of the emergency dump 68. Actuation also applies a rotating force on the drive shaft (not shown) in the gatebox 64 to move it past an over-center position, which enables the gates (not shown) to fall open and dump the fire retardant. The over-center mechanical arrangement will be more fully discussed hereinafter. The switch 78 disconnects the DC power supply 74 from the motor controller 56 upon actuation of the emergency dump 68 to ensure that the motor 58 cannot apply any rotational force to the system. This system and its functions will be more fully discussed hereinafter.

The gatebox system (or "system") can be operated in normal mode using the control logic to open and close the gates in response to a selected Coverage Level and Gallons to Dump. In an alternative mode of operation, the system may be operated in a manual mode, where the gate controller 50 functions are entirely omitted. In this mode, only OPEN and CLOSE actuators are provided, which directly control the motor controller 56. Such an arrangement is considerably less expensive to implement. In the manual mode, the operator uses a third party display and the OPEN and CLOSE switches to meter flow manually. Now, returning to the Gate Controller 50 operated system, once the pilot initiates a drop by depressing the drop trigger, the controller will open the doors and adjust the door angle to maintain a constant flow rate from the hoppers. When the selected gallons to dump have been evacuated, the doors close to capture any remaining fluid in the hoppers. The control system will compensate for various dynamics during the drop event. Table 1 presents a summary of function of the system.

TABLE 1

| Parameter | Device Type | Action | Comments |
|---|---|---|---|
| Dump Trigger | Switch - 1NO, 1NC | Opens the gates when pressed, closes gates when released | Located on flight stick |
| ARMED toggle | Switch, 2 pos, locking detent | Arms FRDS system to enable high voltage to motor, illuminate the ARMED indicator light | Status Indicator on Pilot Interface |
| OPEN/ CLOSE toggle | Switch, 3 pos, momentary, center rest | Opens or closes door when toggled | System must be ARMED |
| Coverage Level +/− toggle | Switch, 3 pos, momentary, center rest | Increases or decreases coverage level when toggled | Sets the desired flow rate from the gate |
| Gallons to Dump +/− | Switch, 3 pos, momentary, center rest | Increases or decreases the gallons to dump when toggled | Sets the desired volume to drop |
| Foam Set/Inject | Switch, 3 pos, momentary, center rest | Sets foam injection value or initiates foam injection | Controls foam system |
| Datawheel | Push button, rotary encoder | Rotation scrolls through menu selections, push selects current item | Located on the Pilot Interface |
| Mark | Switch, momentary | Creates points of interest | For telemetry system only |
| Distress | Switch, momentary | Transmits a distress message | For telemetry system only |
| Menu | Switch, momentary | Enters/exits controller menus | |
| Home | Switch, momentary | Returns display to Home screen | |
| MSG | Switch, momentary | Receives text messages sent to the unit | For telemetry system only |

Figure 3:
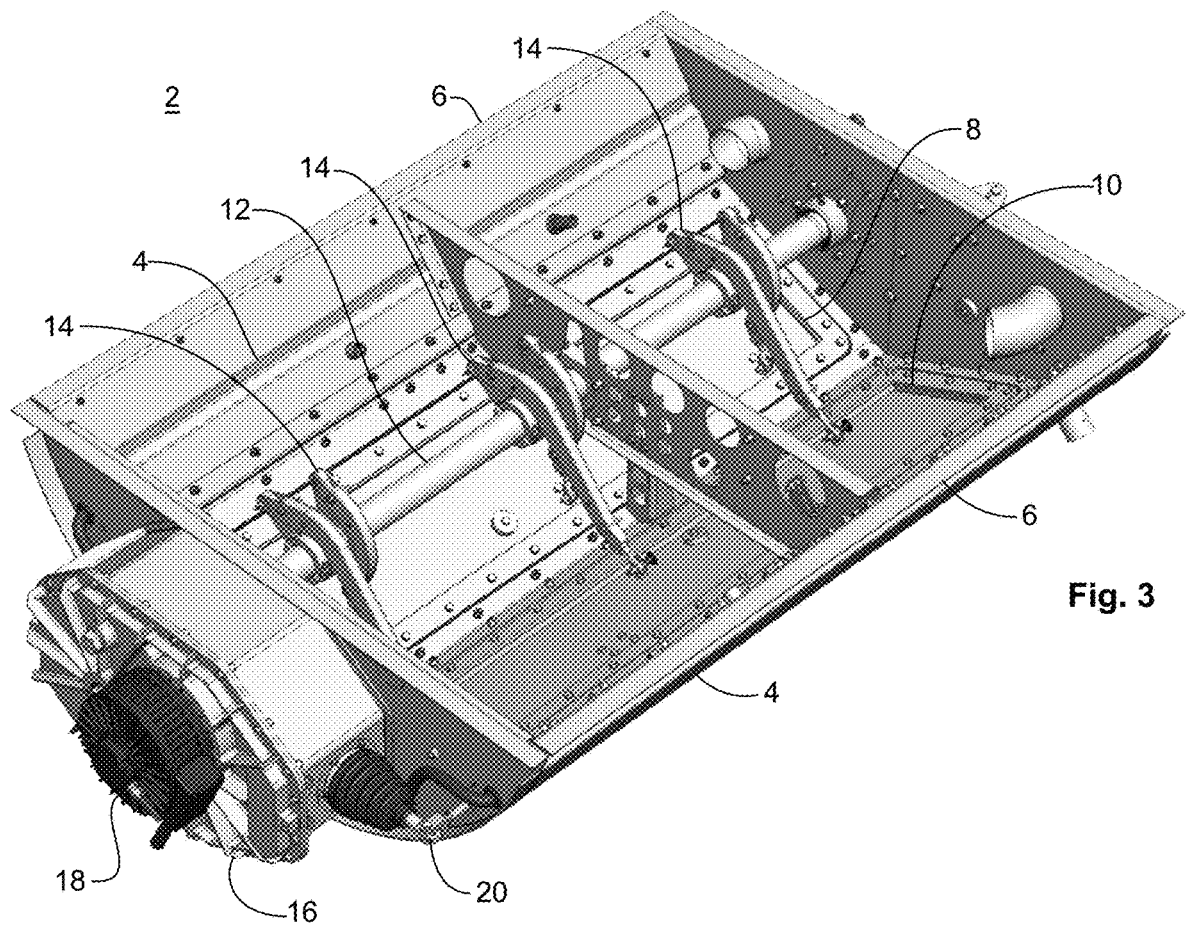
FIG. 3 is a perspective view drawing of a fire retardant gatebox according to an illustrative embodiment of the present invention.

During normal operation of the system, the following operating parameters exist:
- A. Circuit breakers for the system are engaged to distribute bus power from the aircraft to the gate control system
- B. The system microprocessors boot up and current system parameters are displayed on the Pilot Interface
- C. Coverage Level and Gallons to Dump are adjusted to the desired value by the pilot
- D. The pilot toggles the ARMED switch to arm the system
- E. The system is now in standby mode
- F. The pilot depresses the drop trigger on the flight stick to initiate a drop
    - a. The system opens the doors to maintain the desired flow rate, once the desired volume has been released the doors close automatically
- G. Once the drop is complete, the pilot releases the drop trigger. The pilot may choose to release the trigger to close the doors prior to the release of the pre-selected volume
    - a. When the doors are open in any mode, if the pilot released the drop trigger the doors will close
- H. The system returns to standby mode and is ready for another delivery cycle Reference is directed to FIG. 3, which is a perspective view drawing of a fire retardant gatebox 2 according to an illustrative embodiment of the present invention. The gatebox 2 is a riveted aluminum structure 4 that is mounted to the belly of the aircraft. The structure is primarily assembled from 6061-T6 aluminum sheet. The gatebox 2 attaches to the airframe (not shown) using a flange and bolt pattern 6 on the upper portion thereof. Front and rear fiberglass fairings (not shown) are attach between the gatebox 2 and belly of the airframe (not shown) to provide an aerodynamic profile. The Air Tractor AT-802F aircraft comprises forward and rear fiberglass hoppers (not shown) that have throats that exit at the belly of the aircraft to feed fire retardant into the gatebox 2.

The gatebox 2 includes a first and second gate opening 7, 9 that each has a corresponding gate 8, 10 that is hinged along one edge of the gate openings. A piano style hinge is appropriate, and an O-ring seal may be disposed between the gate openings and the gates to provide a water tight seal when the gates 8, 10 are in a closed position to engage the gate openings 7, 9.

A drive shaft 12 is rotatably supported within the gatebox 2 and aligned along the longitudinal axis of the aircraft in this embodiment. The drive shaft 12 is rotatable in both a gates-opening direction and a gates-closing direction, which will be more fully discussed hereinafter. Plural sets of crank arms and connecting links 14 are disposed along the length of the drive shaft 12 for opening and closing the gates 8, 10 by rotation of the drive shaft 12. Each set comprises a crank 22, 24, which are fixed along the length of the drive shaft 12, and a corresponding connecting link 26, 28 that are disposed between a distal end of the crank arms 22, 24 and corresponding gate 8, 10. In this embodiment, three crank arms and connecting links are provided for each gate. A minimum of one crank arm and connecting link is required for each gate. Thusly, rotation of the drive shaft 12 is converted to linear travel by the crank arm and connecting link arrangement to push the gates open in the gates-opening direction of rotation and pull the gates closed in the gates-closing direction.

Figure 4:
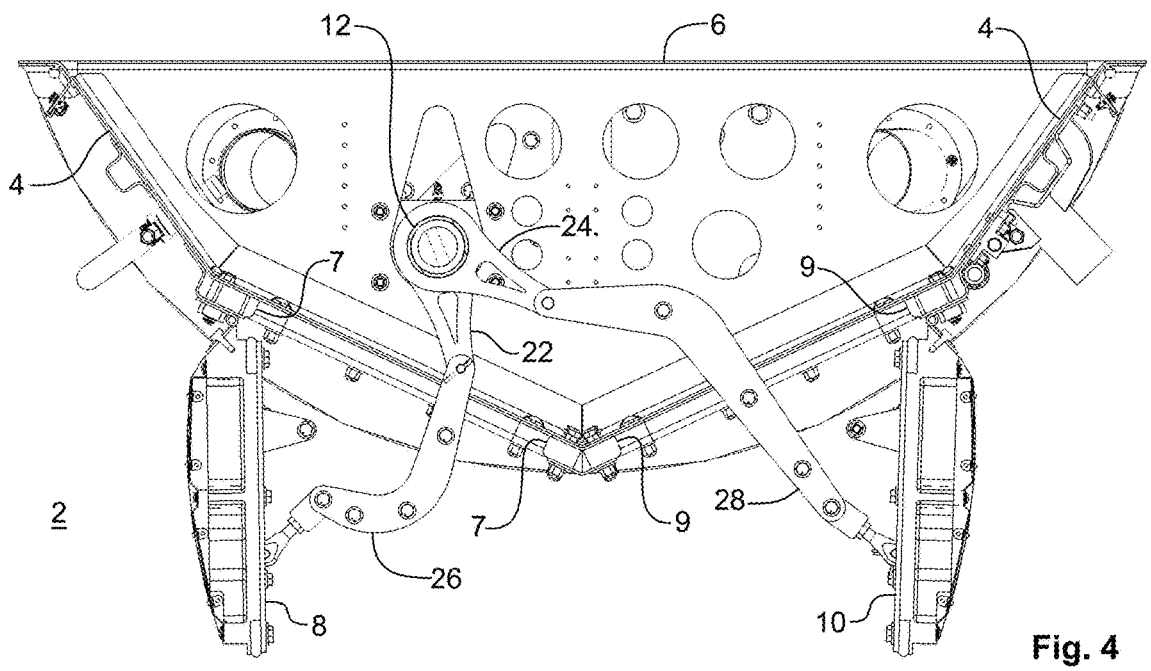
FIG. 4 is a section view drawing of a fire retardant gatebox according to an illustrative embodiment of the present invention.

Reference is directed to FIG. 4, which is a section view drawing of a fire retardant gatebox 2 according to an illustrative embodiment of the present invention. FIG. 4 corresponds with FIG. 3. In FIG. 4, the upper mounting flange 6 is defined by the gatebox 2 aluminum sheet 4 structure, with the first gate opening 7 and the second gate opening 9 formed through a lower portion thereof. A first gate 8 is hingedly connected along an edge of the first gate opening 7. The drive shaft 12 has a first crank arm 22 fixed thereto, which is in-turn coupled from its distal end to the first gate 8 by a first connecting link 26, as illustrated. Similarly, the second gate 10 is hingedly connected along an edge of the second gate opening 9, and the drive shaft 12 also has a second crank arm 24 fixed thereto, which is in-turn coupled from its distal end to the second gate 10 by a second connecting link 28, as illustrated. As noted above, in the illustrative embodiment, there are three sets of crank arms and connecting links for each gate. Thusly, it can be appreciated that rotation of the drive shaft 12 will simultaneously open and close both gates 8, 10, depending on whether it is rotated in the gates-opening or gates-closing directions.

Figure 5:
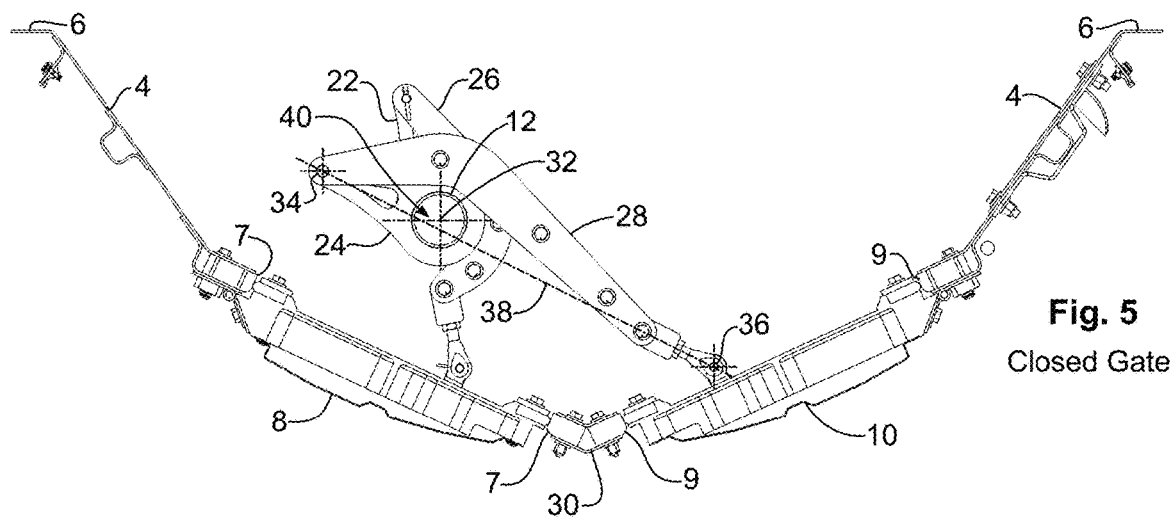
FIG. 5 is a section view drawing of a fire retardant dump gates and drive linkages according to an illustrative embodiment of the present invention.

Reference is directed to FIG. 5, which is a section view drawing of a fire retardant gatebox with drop gates and drive linkages according to an illustrative embodiment of the present invention. FIG. 5 corresponds with FIG. 4. In FIG. 5, the gates 8, 10 are shown in their fully closed position. The gate openings 7, 9 are separated by a portion of the gatebox structure 30, which is used to form a water tight seal while the gates 8, 10 are closed. O-rings or other elastomeric seals are appropriate for this application. Such seals can be applied to the gate openings 7, 9 or the gates 8, 10, or both. The drive shaft 12 can be seen above the gates 8, 10. The first gate 8 is connected to the drive shaft 12 by a first crank arm 22 and a first connecting link 26. Note that the connecting link 26 is has an arcuate shape to facilitate clearance for the drive shaft 12. The second gate 10 is connected to the drive shaft 12 by a second crank arm 24 and a second connecting link 28. Note that the connecting link 28 is has an arcuate shape to facilitate clearance for the drive shaft 12. Also note that the close clearance between the second connecting link 298 and the drive shaft 12 is such that rotation of the drive shaft 12 in the counter-clockwise direction would result in engagement between the connecting link 28 and the drive shaft, which would prevent over-rotation of the drive shaft in the gates-closing direction. This is by design.

Now consider the geometry of the connecting links and crank arms in FIG. 5, which are shown in the closed position with an over-center configuration. The second crank arm 24 has a pivot 34 at its distal end, which connects to the second connecting link 28, which in-turn connects to a pivot 36 attached to the second gate. The centerline 38 between the crank arm pivot 34 and the gate pivot 38 lies below the centerline of the drive shaft 12. As such, a downward load of fire retardant on the second gate will induce a rotation on the drive shaft 12 in the gates-closing direction (counter-clockwise in this view). Thusly, the drive shaft needn't hold the gate closed because the second connecting link 28 will engage the drive shaft 12 to prevent over-rotation in the gates closing direction. Other structure and stops could also be provided to prevent such over rotation. This is an important feature of the present embodiment because it provides that the motor and transmission do not have to be energized or locked to hold the gates closes. It is a passive mechanical arrangement that holds the gates closed. Of course, the first crank arm 22 and first connecting link 26 may provide the same over-center geometry.

Figure 6:
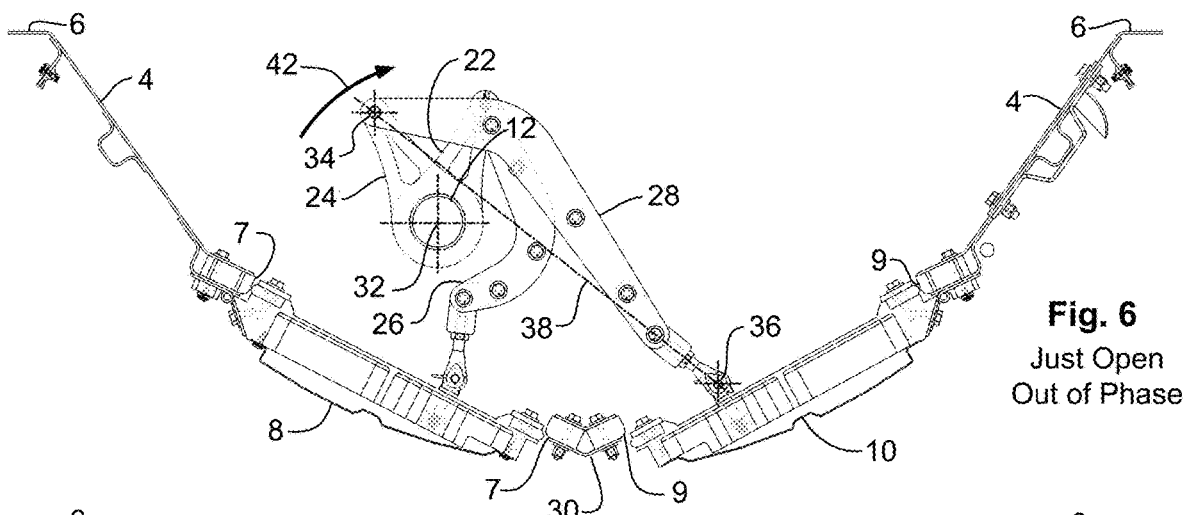
FIG. 6 is a section view drawing of a fire retardant dump gates and drive linkages according to an illustrative embodiment of the present invention.

Reference is directed to FIG. 6, which is a section view drawing of a fire retardant gatebox and drive linkages according to an illustrative embodiment of the present invention. FIG. 6 corresponds with FIG. 5. FIG. 6 illustrates two features of the present design. First, the change in linkage geometry away from the over-center condition, and second the implementation of out of phase gate linkages. In this Figure, the drive shaft 12 has been rotated 42 in the gates-opening direction. As this happens, the centerline 38 between the crank arm pivot 34 and gate pivot 36 has moved above the centerline 32 of the drive shaft 12, and away from the over-center condition. Therefore, the weight of the fire retardant on the gates 8, 10 will induce rotation of the drive shaft in the gates-opening direction. This is important with respect to the emergency dump feature (described elsewhere herein) because it enables manual opening of the gates with minimal force and distance of movement. All that need occur is to disconnected the motor drive and transmission from the drive shaft 12, and then apply just enough rotation in the gates-opening direction to move past the over-center condition. As soon as that occurs, the weight of the fire retardant will cause the gates to fall open and immediately drop the entire load of fore retardant.

The other feature illustrated in FIG. 6 is the out of phase link arrangement. The rotational forces applied to the drive shaft 12 are provided by the motor and transmission (not shown) and vary along the distance of rotational travel of the drive shaft 12. The highest forces occur as the linkages pass through the over-center position, and as the seals around the gate openings are engaged. Since there are two gates, the forces occur in two parts, and the total force is approximately twice that of a single gate operating force. By adjusting the position of the crank arms 24, 22, and/or the lengths of the crank arms and connecting links 26, 28, the designer can adjust these force peaks to be out of phase with one another, and therefore spread them out over the distance of rotational travel of the drive shaft 12. This has the effect of reducing the peak torque required from the motor and transmission. In FIG. 6, it can bee seen that the second gate 10 has opening slightly more than the first gate 8, and this illustrates the out of phase linkage arrangement.

Figure 7:
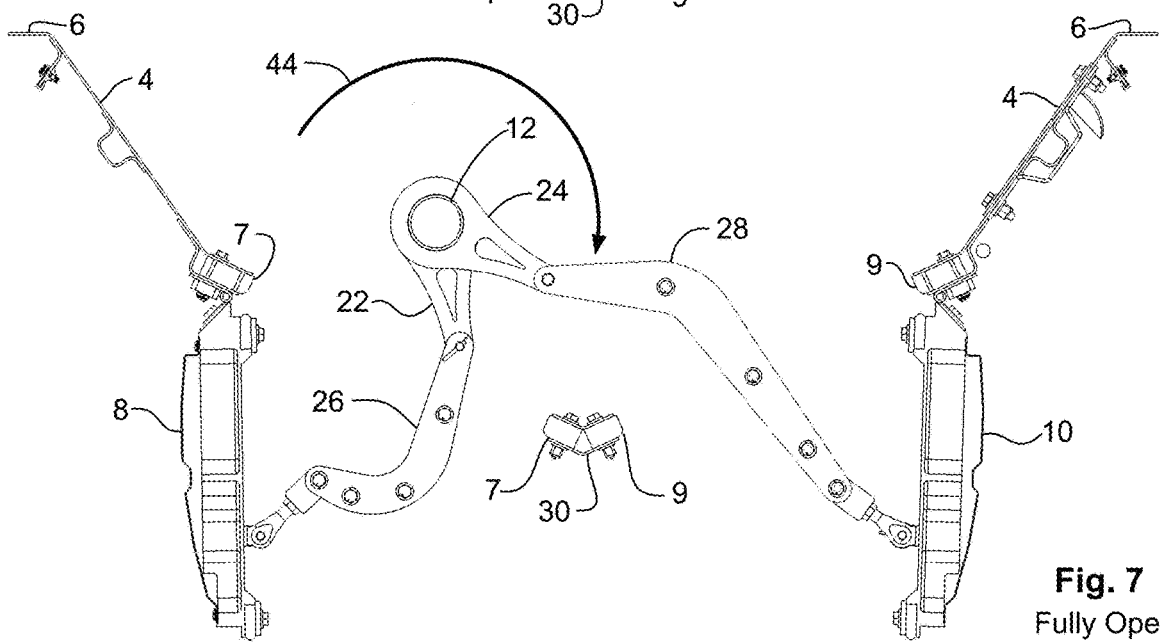
FIG. 7 is a section view drawing of a fire retardant dump gates and drive linkages according to an illustrative embodiment of the present invention.

Reference is directed to FIG. 7, which is a section view drawing of a fire retardant dump gates and drive linkages according to an illustrative embodiment of the present invention. FIG. 7 corresponds with FIGS. 5 and 6. In FIG. 7, the weight of the fire retardant (not shown) has pushed the gates 8, 10 fully open and the fire retardant has been completely dropped by the gates. The falling action of the gates 8, 10 has been coupled through the connecting links 26, 28 and the crank arms 22, 24 and caused the drive shaft 12 to rotate fully 44 in the gates-open direction. The ability of the gates to fall open depends upon disconnection of the drive shaft 12 from the motor and transmission (not shown). If such a disconnect is not implemented, then the movement of the gates 8, 10 remains under control of the system, by the motor and transmission.

Figure 8:
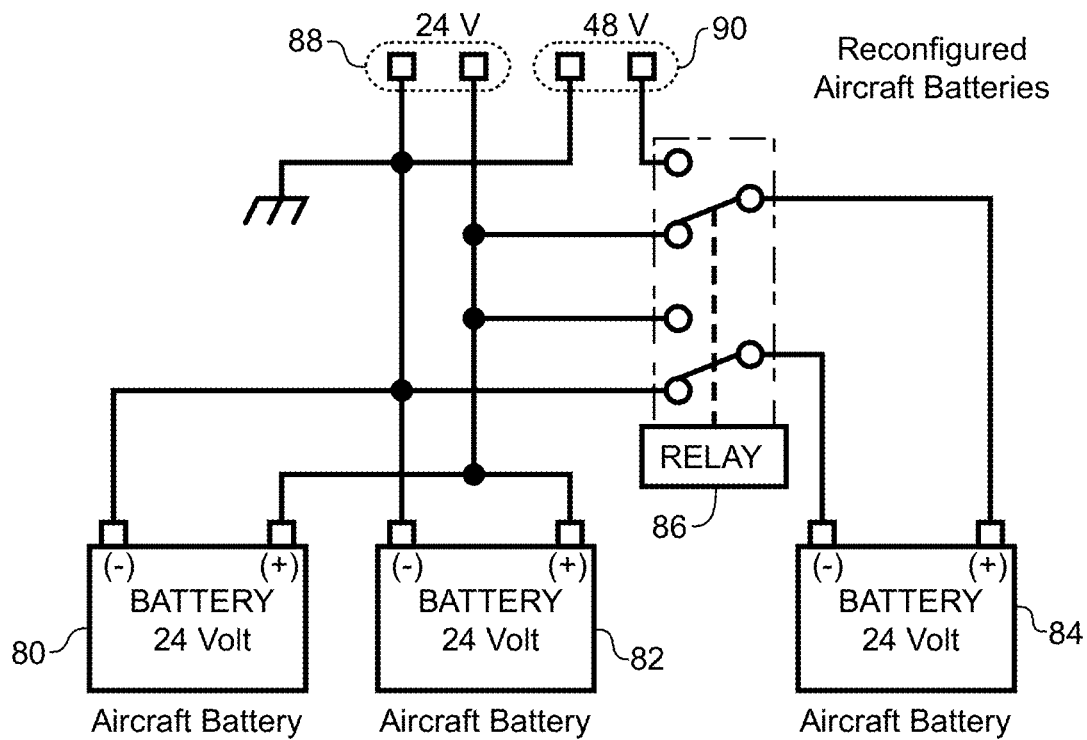
FIG. 8 is a diagram of a power supply according to an illustrative embodiment of the present invention.

Reference is directed to FIG. 8, which is a schematic diagram of a power supply according to an illustrative embodiment of the present invention. As was discussed hereinbefore, modern aircraft commonly provide a DC power bus that provides 24-volt (nominal) power for accessories. The present disclosure contemplates the use of 24-volt motors and circuitry that can be directly coupled to such a power bus. However, the use of a higher voltage power supply offers certain advantages, particularly with respect to the available power and torque in an electric motor of a given frame size. Higher voltage also enable designers to user lighter gauge wiring for a given motor rating, since the current is halved by a doubling of the voltage. FIG. 8 illustrates one technique for doubling the power supply voltage by rearranging the interconnection amongst plural batteries provided with the aircraft.

FIG. 8 illustrates an aircraft that originally provides three 24-volt batteries 80, 82, 84, which are originally connected in parallel to drive the aircraft power bus, at terminals 88. Under the teachings of the present disclosure, one of the batteries 84 is selected to be rewired, and interconnected with a suitable DPDT relay 86. In its unpowered state, the relay 86 couples the selected battery 84 in parallel with the non-selected batteries 80, 82. As such, the system operates as originally provided by the aircraft manufacture, in that all three batteries are in parallel and are coupled to provide 24-volts to the aircraft bus terminals 88. The aforementioned gate controller (not shown) is coupled to drive the relay 86 into a powered state when the systems requires 48-volts for operation. This would occur at any time the gate controller operates the drive motor. When this occurs, the relay 86 contacts switch states and the selected battery 84 is temporarily wired in series with the two unselected batteries 80, 82, and the 48-volts that that arrangement provides is delivered to the motor power terminal 90. When the motor operations are complete, the relay 86 is deenergized to return to the 24-volt operating mode.

Figure 9:
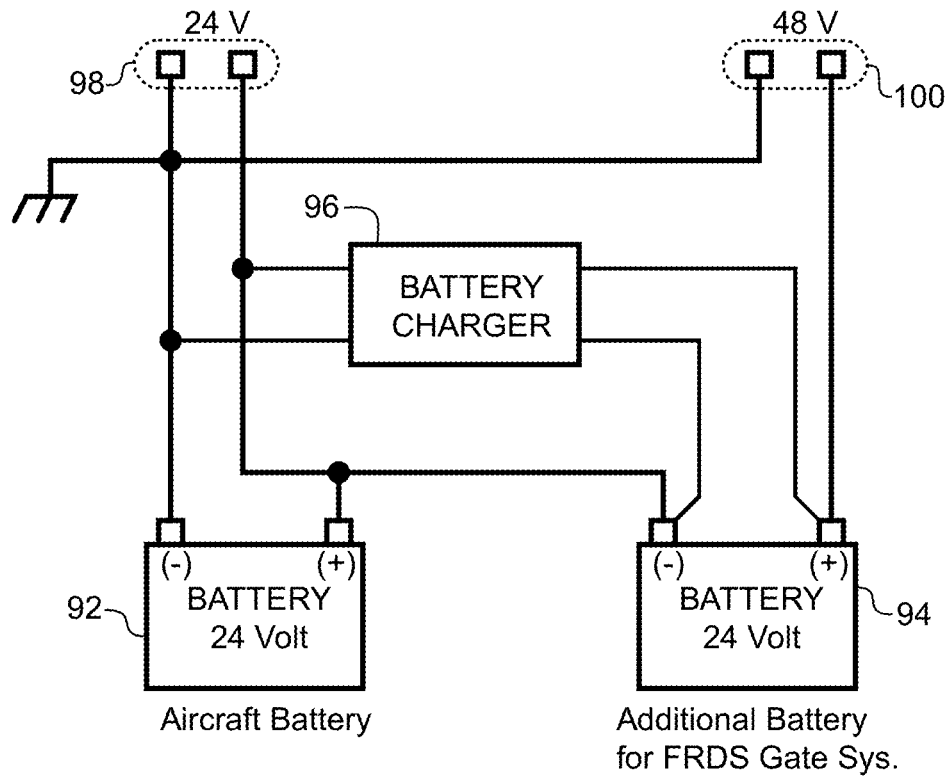
FIG. 9 is a diagram of a power supply according to an illustrative embodiment of the present invention.

Reference is directed to FIG. 9, which is a diagram of a power supply according to an illustrative embodiment of the present invention. FIG. 9 illustrates an alternative circuit design for providing 48-volts to the motor and motor controller (not shown) of the present disclosure's gatebox system. In this embodiment, an additional battery 94 is added to the existing aircraft power system batteries 92. Note that only a single aircraft battery 92 is illustrated in the circuit to simplify the schematic diagram. In actuality, there would be plural batteries at the connection of battery 92. The aircraft batteries 92 deliver 24-volts to the aircraft power bus at terminal 98. The additional battery 94 is wired in series with the aircraft power bus to provide 48-volts to the motor power supply terminals 48. In order to maintain a charge on the additional battery a battery charger 96 is provided, which draws power from the aircraft bus and charges the additional battery 94.

During normal operation, the gatebox system of the present disclosure is operated by the gate controller utilizing an electric motor to operate the gatebox gates, and the system is designed to be reliable and trouble free. However, as in all things aviation related, redundancy and manual alternatives are needed to be certain the pilot can safely return the aircraft to ground, or avoid a dangerous aeronautical situation. To that end, the present disclosure provides an emergency drop system, which is also referred to as an emergency dump or "E-Dump" system. This system must be operable without external power of any kind, and must be operable by the pilot from the cockpit. Accordingly, the present disclosure teaches an independent, fully mechanical system configured so that the gates can be opened in the event the gatebox system is inoperative. When power is off to the gatebox system, a mechanical over-center latch arrangement is used to keep the gatebox gates closed. This latch system allows for a fire retardant load to be retained in the hoppers indefinitely without any action from the gatebox system, as was described above.

In order to open the gates using the emergency drop system, the pilot pushes an emergency drop handle forward in the cockpit causing a series of linkages to open the gatebox gates past the over-center latched position. The emergency drop system will function even if electrical power to the system is lost. A series of limit switches are wired into the system to cut control power to the gatebox system in the case where electrical power still exists. In one embodiment, the emergency drop handle is connected to a series of bell cranks and linkages as well as two series connected electronic limit switches. When the lever is pushed forward, the limit switches are opened. This provides a signal to the gate controller that an emergency drop has been initiated. The gate controller then inhibits any commands to the electric motor. The lever also enacts a mechanical series of linkages, which pull a release fork inside the transmission that is mounted to the front of the gatebox so as to decouple the electric motor's output shaft from the gate drive shaft. This action removes the motor from the mechanical system. Another part of the emergency drop system linkage pulls a crank arm located on the back side of the gatebox. This rotates the gatebox's drive shaft so that the gate linkages are pulled back over-center. Once pulled into the un-latched position, the gates rotate to the fully open position due to the weight of the fire retardant in the aircraft's hoppers, which instantly empties the aircraft fire retardant hoppers.

Figure 10:
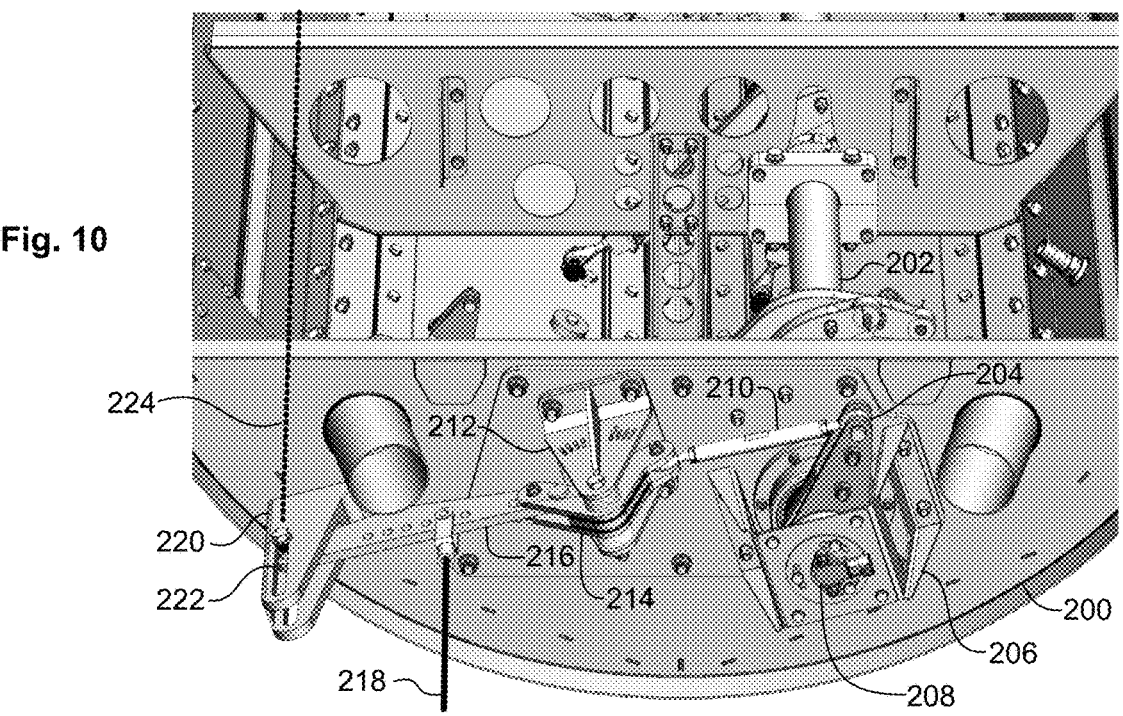
FIG. 10 is a perspective view drawing of an emergency dump linkage according to an illustrative embodiment of the present invention.

Reference is directed to FIG. 10, which is a perspective view drawing of an emergency drop system linkage according to an illustrative embodiment of the present invention. The end wall 200 of the gatebox serves as the mounting location for the mechanical components of the emergency dump system. External connections to this system include the pilot pull rod 218, which is connected to an operating handle in the cockpit, and, the clutch rod 224, which connects to a clutch located in the transmission (not shown) at the opposite end of the gatebox. The clutch rod 224 is illustrated in broken line because it is located behind the gatebox. The drive shaft 202 extends through the end wall 200, and is connected to a crank arm 204 supported within a drive shaft mount 206. Not that the drive shaft position sensor 208 is located on the mount 206, and communicates the drive shaft position to the gate controller (not shown). A crank rod 210 is linked between the crank arm 204 and a first end of a bell crank 214, which is rotatably supported in a suitable mount 212. A dump link 216 is connected to the opposite end of the bell crank 214, and is connected to the clutch rod 224 at its opposite end. The connection between the dump link 216 and the clutch rod 224 is guided and limited in range of movement by a slot 222 in the clutch rod bracket 220. The pilot pull rod 218 is connected to the dump link 216 along its length.

Figure 11:
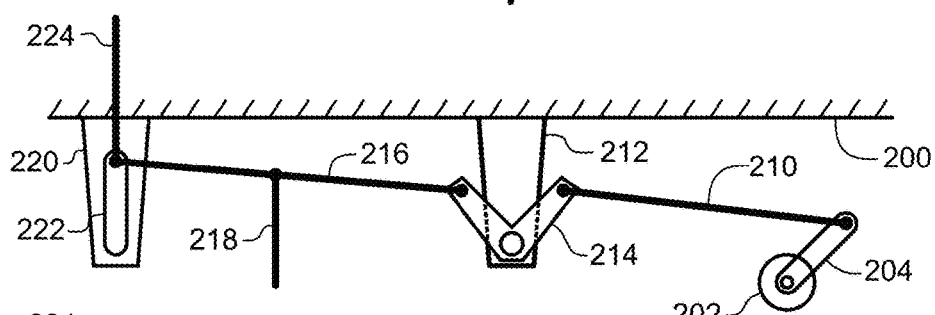
FIG. 11 is a diagram of an emergency drop linkage according to an illustrative embodiment of the present invention.
Figure 12:
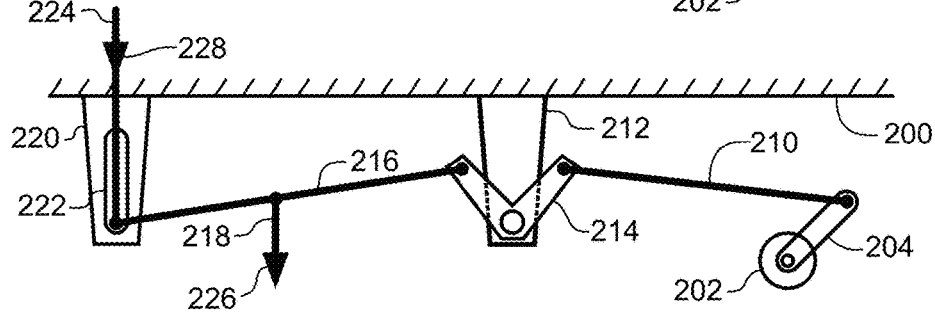
FIG. 12 is a diagram of an emergency drop linkage according to an illustrative embodiment of the present invention.
Figure 13:
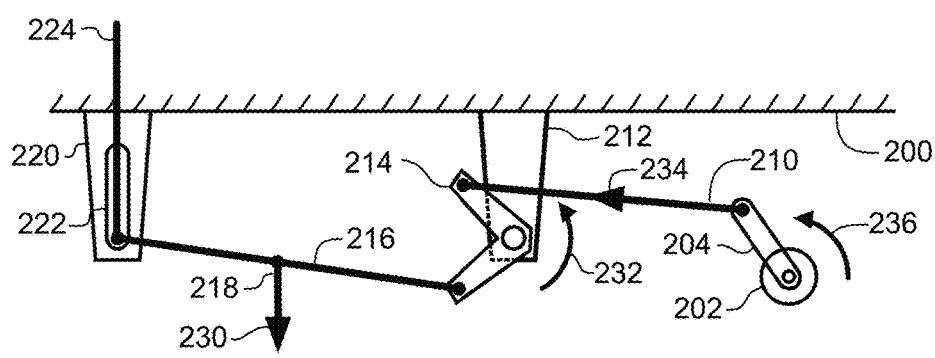
FIG. 13 is a diagram of an emergency drop linkage according to an illustrative embodiment of the present invention.

Reference is directed to FIGS. 11, 12, and 13, which are operating diagrams of the emergency dump linkage system of FIG. 10, and according to an illustrative embodiment of the present invention. The emergency dump system functions through three states, corresponding to FIGS. 11, 12, and 13, respectively. FIG. 11 shows the system in the normal state where the gates (not shown) are closed, the clutch (not shown) is engaged, and the drive shaft 202 has been rotated in the gates-closing direction such that the aforementioned over-center condition holds the gates closed. Note that in these figures, the orientation of the drive shaft 202 and crank arm 204 have been rotated ninety degrees with respect to the end wall 200 of the gatebox for visual clarity. FIG. 12 shows the emergency dump linkage in the clutch-released state, and FIG. 13 shows the linkage in the gates-open state.

In FIG. 11, the crank arm 204 is located to the right, which is the over-center position, whereby the gates (not shown) hold themselves closed. The bell crank 214 is also rotated to the rights, as shown, by virtue of the crank rod 210 linkage. The clutch rod 224 is forward, which is the clutch-engaged position. The pilot pull rod 218 is also in the forward position. Note that "forward" means to toward the front of the aircraft, which is up in these drawing figures. In FIG. 12, the pilot has pulled 226 the pilot pull rod 218 partially rearward to activate the second state of the linkage system. The pilot pull rod 218 pulls 226 the dump link 216 rearward, which pulls 228 the clutch rod 224 rearward, thereby disengaging the clutch (not shown). The movement 228 of the clutch rod 224 is limited by the slot 222 in the clutch rod bracket 220. Once this limit of movement is reached, the dump link 216 begins rotating the bell crank 214 to the left, transitioning to the open state of FIG. 13.

In FIG. 13, the pilot pull rod 218 has pulled 230 fully rearward, which rotates 232 the bell crank 214 to the left. This action causes the crank rod 210 to pull 234 the crank arm 204, thereby rotating 236 it to the left, and past the aforementioned over-center condition. The weight of the fire retardant (not shown) on the gates (not shown) promptly forces the gates open, and dumping the fire retardant from the hoppers.

Figure 14:
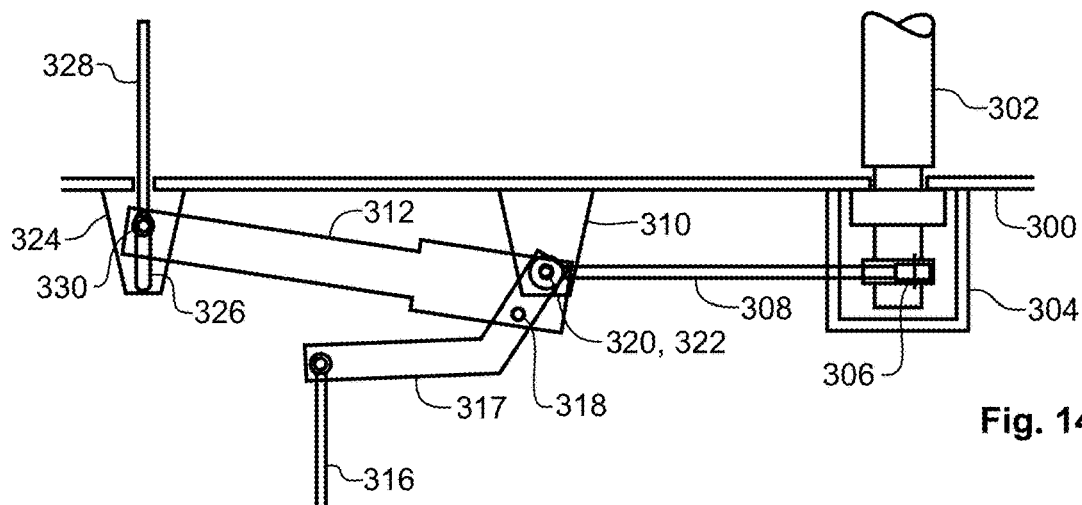
FIG. 14 is a diagram of an emergency drop linkage according to an illustrative embodiment of the present invention.
Figure 15:
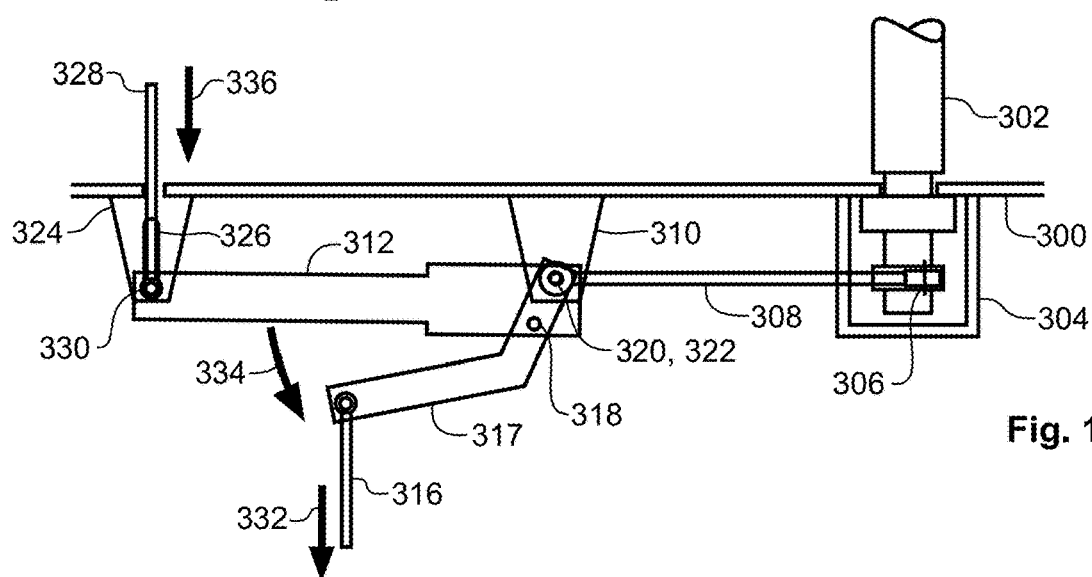
FIG. 15 is a diagram of an emergency drop linkage according to an illustrative embodiment of the present invention.
Figure 16:
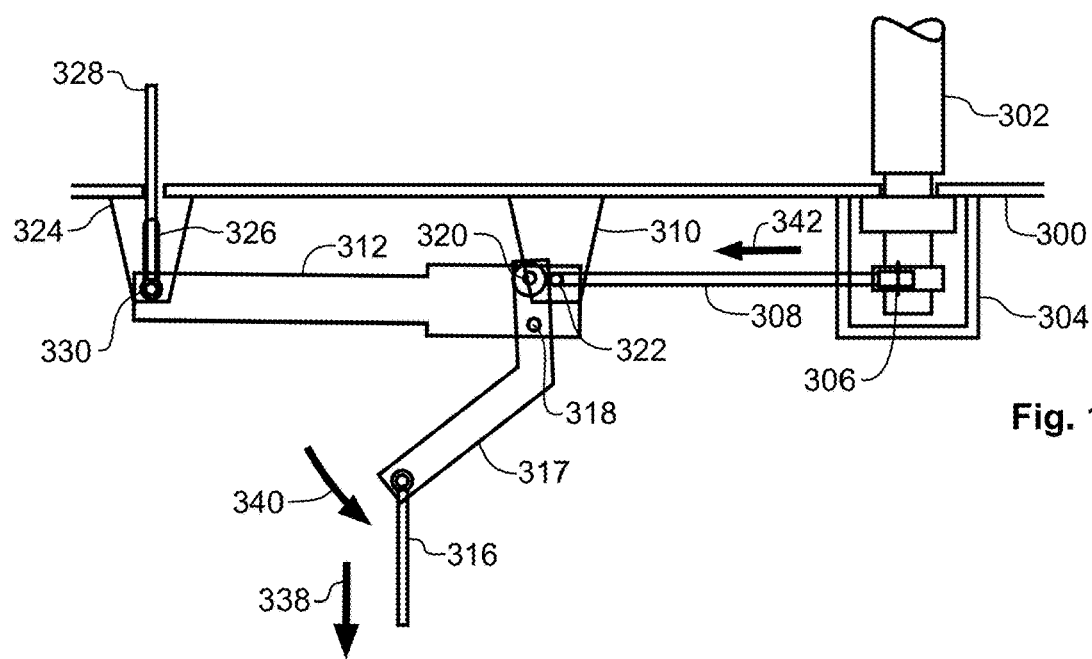
FIG. 16 is a diagram of an emergency drop linkage according to an illustrative embodiment of the present invention.

Reference is directed to FIGS. 14, 15, and 16, which are emergency dump linkage diagrams according to an illustrative embodiment of the present invention. This emergency dump system functions through three states, corresponding to FIGS. 14, 15, and 16, respectively. FIG. 14 shows the system in the normal state where the gates (not shown) are closed, the clutch (not shown) is engaged, and the drive shaft 302 has been rotated in the gates-closing direction such that the aforementioned over-center condition holds the gates closed. FIG. 15 shows the emergency dump linkage in the clutch-released state, and FIG. 16 shows the linkage in the gates-open state.

The linkage arrangement in FIGS. 14, 15, and 16 are attached to the rear bulkhead 300 of the gatebox. The drive shaft 302 is supported on a drive shaft mount 304, and has a crank arm 306 attached to its end, which enables rotation of the drive shaft 302 by the various linkages. This embodiment comprises two levers that enable operation, and these include the crank lever 317 and the clutch lever 312. The clutch lever 312 pivots about a clutch lever pivot 322 on a clutch lever mount 310. The crank lever 317 pivots about a crank lever pivot 318 that is connected to the clutch lever 312, as illustrated. A crank rod 308 is connected to a distal end of the crank arm 306 and to a crank rod pivot 320 located on the clutch lever 312, as illustrated. Note that the crank rod pivot 320 and the clutch lever pivot 322 are aligned, one above the other, but not connected, in the aforementioned first and second states. A pilot pull rod is connected to a distal end of the crank lever 317. A clutch rod is connected 330 to a distal end of the clutch lever 312, and its movement is limited by a slot 326 in a clutch rod mount 324, as illustrated.

In FIG. 14, the pilot pull rod 316 is in the forward position (toward the front of the aircraft, and up in the drawing figure). The clutch rod 328 is also in the forward position, where the clutch (not shown) is engaged. The crank arm 306 is to the right, and the drive shaft 302 is in the over-center position, holding the gates (not shown) closed as discussed hereinbefore. In FIG. 15, the pilot has pulled 332 the pilot pull rod 316 rearward. This action rotates 334 the crank lever 317 and the clutch lever 312 downward (counter-clockwise in the figures). Rotation of the clutch lever 312 pulls 336 the clutch rod 328 rearward, disengaging the clutch (not shown). The extent of this movement 336 is limited by the clutch slot 326 in the clutch rod mount 324. Once the limit of the clutch slot is reached, then further rearward movement 338 (FIG. 16) of the pilot pull rod 317 results in rotation 340 of the crank lever 317.

In FIG. 16, the pilot pull rod 316 has been pulled 338 to its rearward extent, and the crank lever 317 has been rotated 340 to its full extent. This action causes the crank lever 317 to rotate about the crank lever pivot 318, and pull the crank rod 308, to thereby rotate the drive shaft 302 past the over-center condition. This action causes the gates (not shown) to drop open, as discussed hereinbefore. It is noteworthy to consider the utility of having the clutch lever pivot 322 and the crank arm connection point 320 aligned with one another while the crank arm 308 is full to the right. With this, pulling (322 in FIG. 15) the pilot pull rod 316 and rotating 334 the crank lever produces no force on the crank rod 308. This allows the full effort of the pilot's action to first disengage the clutch by rotating the clutch lever 312 first, and not beginning rotation of the crank lever 317 until the clutch rod 328 has engaged the rearward end of the slot 326. After that occurs, then all of the pilot's pull force is directed to pulling the crank arm 306 and drive shaft 302 back over-center.

Figure 17:
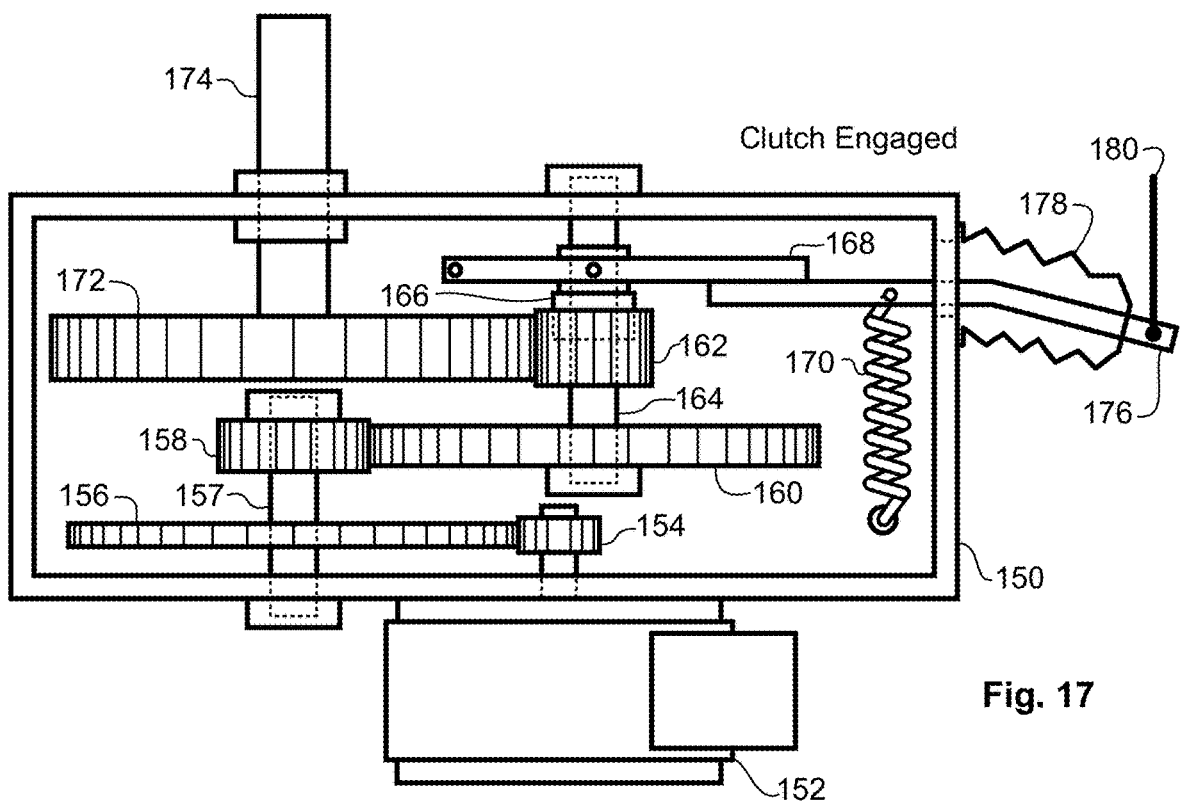
FIG. 17 is a section view drawing of a gear reduction transmission with clutch according to an illustrative embodiment of the present invention.
Figure 18:
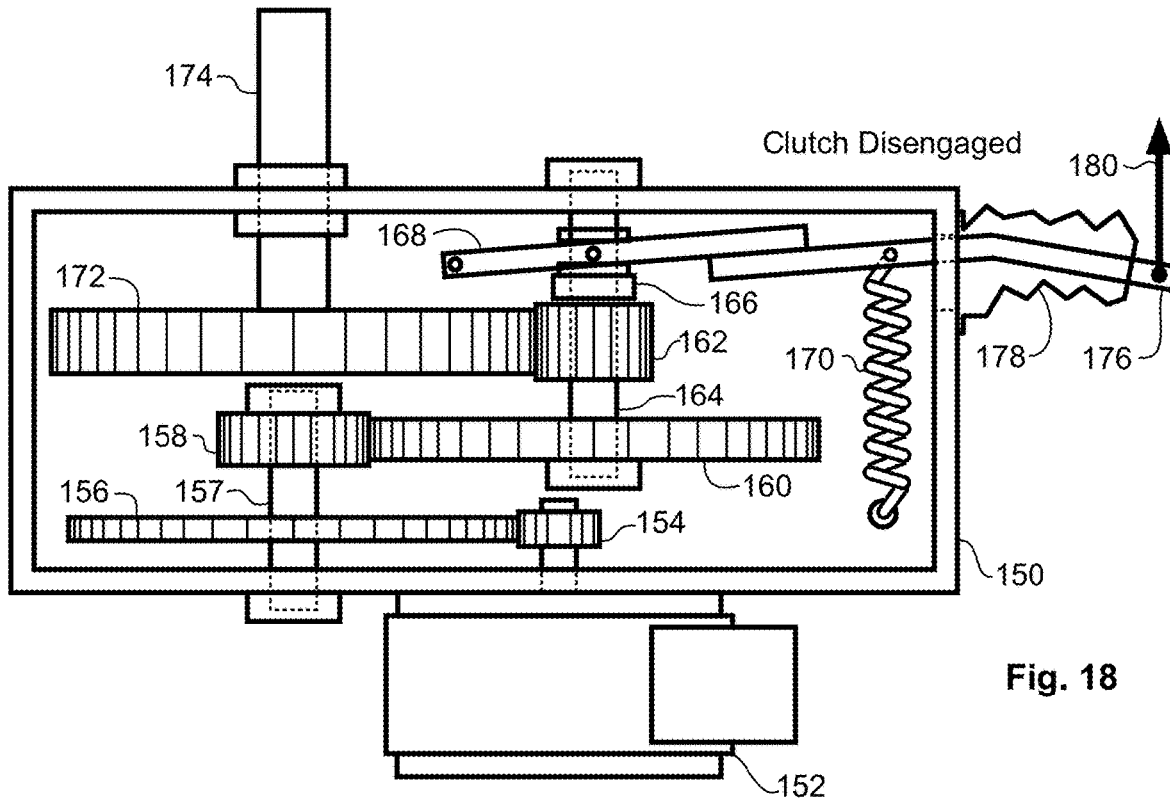
FIG. 18 is a section view drawing of a gear reduction transmission with clutch according to an illustrative embodiment of the present invention.

Reference is directed to FIGS. 17 and 18, which are a section view drawings of a gear reduction transmission with clutch according to an illustrative embodiment of the present invention. This device corresponds to item 16 in FIG. 3. FIG. 17 illustrated the transmission with the clutch 166, 162 engaged, and FIG. 17 with the clutch 166, 162 disengaged. The transmission comprises a housing 150, which encloses and supports a range of shafts, gears and bearings. The servo-motor 152 is mounted to the exterior of the housing 150, and presents a drive gear 154 within the housing 150. A first gear reduction is achieved by meshing the drive gear 154 with a first driven gear 156. This force is applied through shaft 157 to the next gear reduction set of gears 158 and 160. This force is coupled, in turn, to shaft 164. Shaft 164 is splined to a clutch cog 166, which is shiftable to either engage the interior of clutch gear 162, or allows clutch gear 162 to free wheel. In either case, clutch gear 162 meshes with output gear 172, which is fixed to the output shaft 174. The output shaft 174 is attached to the aforementioned drive shaft (not shown) in the gatebox (not shown). In other illustrative embodiments, the clutch arrangement 162, 164, 166 is implemented in alternative configurations. For example, the clutch function can be implemented using an off-the-shelf gear box as the transmission, and then employ a similar fork arrangement to engage and disengage a mating set of splines, or hardened pin and dogs that engage one anther. The functional aspect of this and other arrangements is to mechanically disengage the gearbox and motor from the drive shaft 174, including coupling the clutch operation to the aforementioned emergency release system, as will be appreciated by those skilled in the art.

Operation of the clutch is accomplished by sliding the clutch cog 166 along its splined connection to shaft 164 to either engage or disengage clutch gear 162. This is accomplished by moving shift fork 168 by applying a pulling force 180 at the distal end of shift rod 176. This is accomplished by the aforementioned clutch rod in the emergency dump system. A spring 170 is provided within the transmission housing 150 to return the clutch 162, 166 to the engaged condition. A weather seal boot 178 is provided about the shift rod 176.

Referring back to FIGS. 3, 4, 5, 6, and 7, it is noted that a single drive shaft 12 employed pairs of crank arms 22, 24 and connecting links 26, 28 to drive the pair of gates 8, 10, in the opening and closing directions. That drive shaft 12 was driven through a transmission 16 by an electric motor 18. In an alternative embodiment now presented, a pair of drive shafts may be employed. The two shafts are mechanically coupled together using a shaft synchronizer, which may employ one of serval designs, as will be more fully discussed hereinafter. The two shafts may be driven in a common direction of rotation ("common rotation") or may be driven in opposite directions of rotating ("counter-rotation"), with cranks arms and connecting links that are arranged to manage and synchronize gate movement in both the gates-opening and gates-closing directions. Note that "synchronization" does not necessarily mean the gates move in identical or identically symmetrical fashion. Rather, the movement of the gates is synchronized to be repeatable, and may employ non-symmetrical movement to facilitate fire retardant flow rates, driving force requirements, emergency release operation, as well as other considerations.

Figure 19:
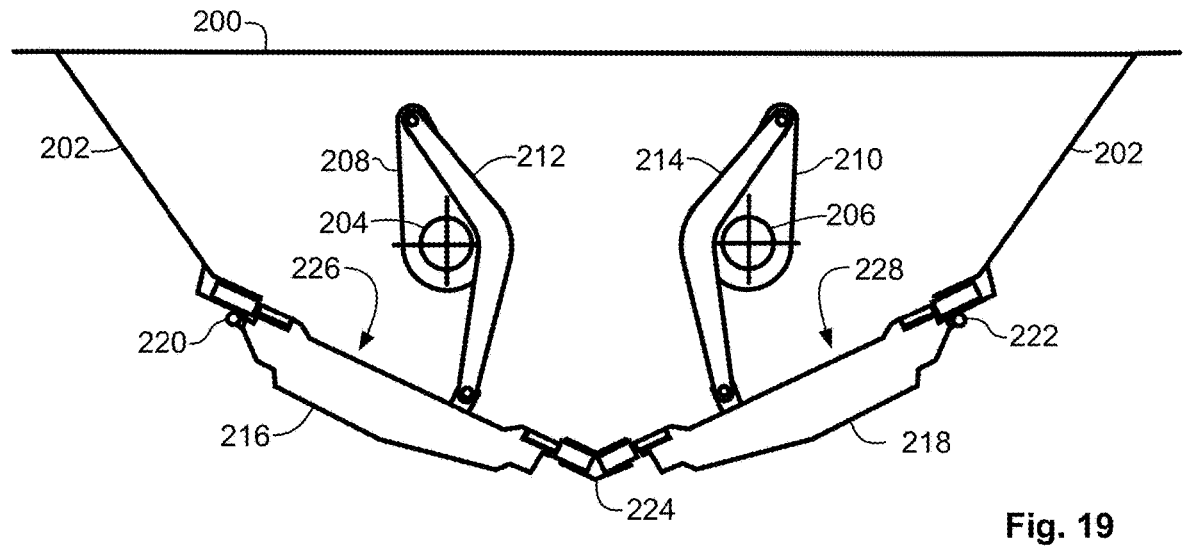
FIG. 19 is a section view drawing of a dual shaft gatebox assembly with the gates closed according to an illustrative embodiment of the present invention.

Reference is directed to FIG. 19, which is a section view drawing of a dual shaft gatebox 202 assembly with the gates 216, 218 in the closed position, and according to an illustrative embodiment of the present invention. The gate box 202 has an attachment flange 200 for mating with the aircraft fluid hopper (not shown) at its upper portion. A pair of gates 216, 218 are hinged 220, 222 along corresponding openings 226, 228 in the gate box 202, as illustrated. The openings 226, 228 are separated by a center portion 224, which serves as a seal point around a portion of the perimeter of openings 226, 228. There are two drive shafts 204, 206 arranged in parallel in the gate box 202, and generally disposed above their respective gates 216, 218. The two drive shafts 226, 228 have corresponding sets of crank arms 208, 210 connected to corresponding connecting links 212, 214, which are arranged so that rotation of the drive shafts 204, 206 urges the gates 216, 218 in respective gates-opening and gates-closing directions.

Figure 20:
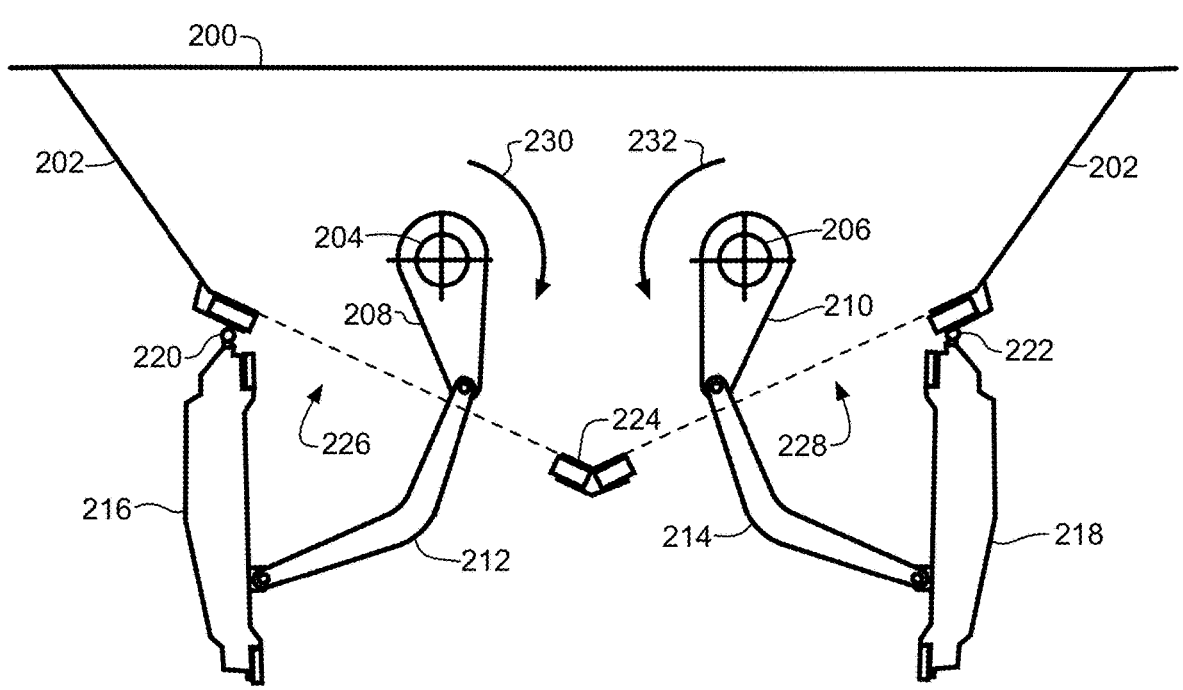
FIG. 20 is a section view drawing of a dual shaft gatebox assembly with the gates open according to an illustrative embodiment of the present invention.

Reference is directed to FIG. 20, which is a section view drawing of a dual shaft gatebox assembly 202 with the gates 216, 218 open according to an illustrative embodiment of the present invention. FIG. 20 corresponds with FIG. 19, but in FIG. 20, the drives shafts 204, 206 have been rotated 230, 232 in the gates-opening direction so as to open the gates 216, 218. As such, the gates 216, 218 have moved away from the center portion 224, and any fire retardant (not shown) in the system will have been dispensed. Note that the drive shafts 204, 206 are rotated 230, 232 in counter-rotation directions. The crank arms 208, 210 have moved in a downward direction, causing the crank arms 212, 214 to drive the gates 216, 218 open. Reversing the rotation would close the gates. Note that with the counter rotation of shafts 204, 206, the components can be symmetrical about a vertical centerline, which somewhat simplifies the design arrangement and mechanical calculations, as will be appreciated by those skilled in the art.

It should be noted that the specific geometry of the drive shafts 204, 206, the crank arms 208, 210, and the first and second connecting links 212, 214 provides a wide range of opportunities to the system designer. The individual drive shafts may synchronized to operate in the same or opposing directions of rotation, and may be positioned and spaced apart to satisfy system requirements and physical limitations. The crank arms can be positioned at any angle with respect to the drive shaft orientation, and may extend to any suitable distance from the drive shaft centerlines. The connecting links may be routed between the two drives shafts, as illustrated in FIGS. 19 and 20, or may be routed about the outboard sides of the drive shafts. Furthermore, the amount of angular rotation required to move the gates from fully closed to fully open is also a design option available according to this range of geometries. This enables management of the motor drive system power and torque requirement and how they are utilized, as will be appreciated by those skilled in the art. In other embodiments, the connecting links 212, 214 employ a flexible member, such as chain, cable or links (not shown). Since the bulk of the flow control occurs in the gates-opening direction, a taught flexible member will provide the requisite opening control. The aforementioned over-center geometery is still achieved by selecting the orientation of the crank arms 208, 210 such that the flexible connecting links wrap somewhat about the drive shafts 204, 206 at the gates closed position.

Figure 21:
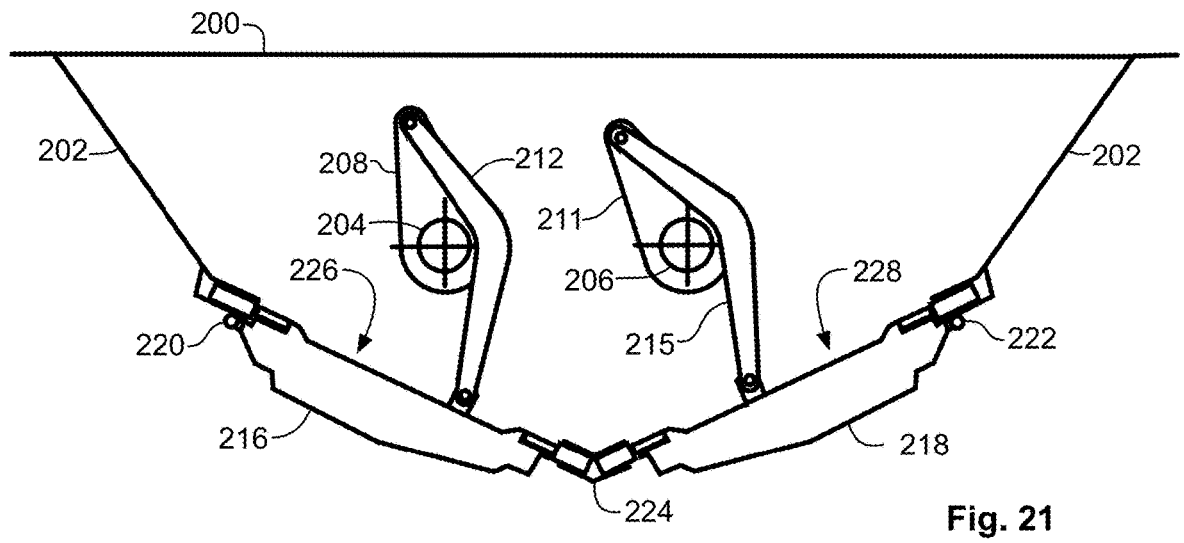
FIG. 21 is a section view drawing of a dual shaft gatebox assembly with the gates closed according to an illustrative embodiment of the present invention.

Reference is directed to FIG. 21, which is a section view drawing of a dual shaft gatebox assembly 202 with the gates 216, 218 closed according to an illustrative embodiment of the present invention. This embodiment presents the same gate box assembly 202 as in the prior figures, but with common rotation of the two drive shafts 204, 206. It will be shown hereinafter, that common versus counter rotation designs affect the options for design of the shaft synchronizer (not shown in this FIG. 21). The first drive shaft 204 employs the same crank arm 208 position and the same connecting link 212 arrangement as the immediately previous two-shaft embodiment. However, the second drive shaft 206 employs a crank arm 211 that is positioned differently, and a different connecting link 215 coupled to the second gate 218 such that clockwise rotation, as viewed in the drawing figure, of the second drive shaft drives the seance gate 218 in the gates-opening direction. An over-center geometry is still employed for both connecting links 212, 215, as discussed hereinbefore.

Figure 22:
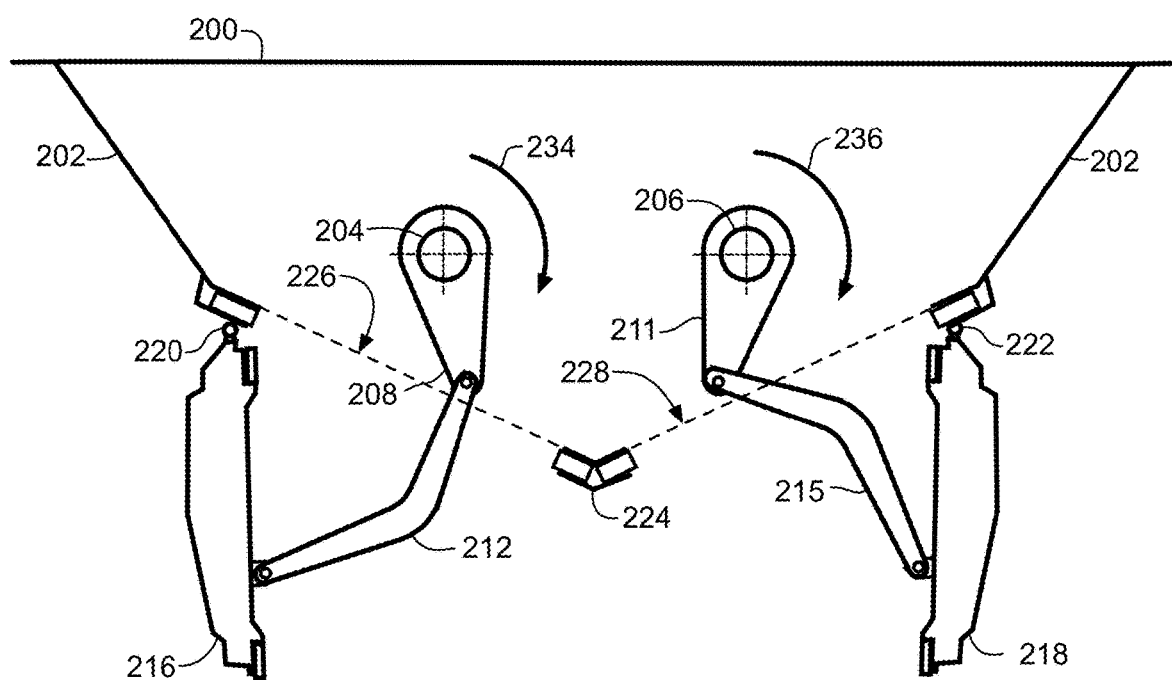
FIG. 22 is a section view drawing of a dual shaft gatebox assembly with the gates open according to an illustrative embodiment of the present invention.

Reference is directed to FIG. 22, which is a section view drawing of a dual shaft gatebox assembly 202 with the gates 216, 218 open according to an illustrative embodiment of the present invention. FIG. 22 corresponds with FIG. 21. In FIG. 21 it is shown that the first and second drive shafts 202, 206 have been rotated 234, 236 in the clockwise directions (as illustrated) such that the respective crank arms 208, 211 and connecting links 212, 215 have driven the gates 216, 218 fully toward the gates open direction. Reversing rotation of the shafts 204, 206 would drive the gates in the gates-closing direction.

Figure 23:
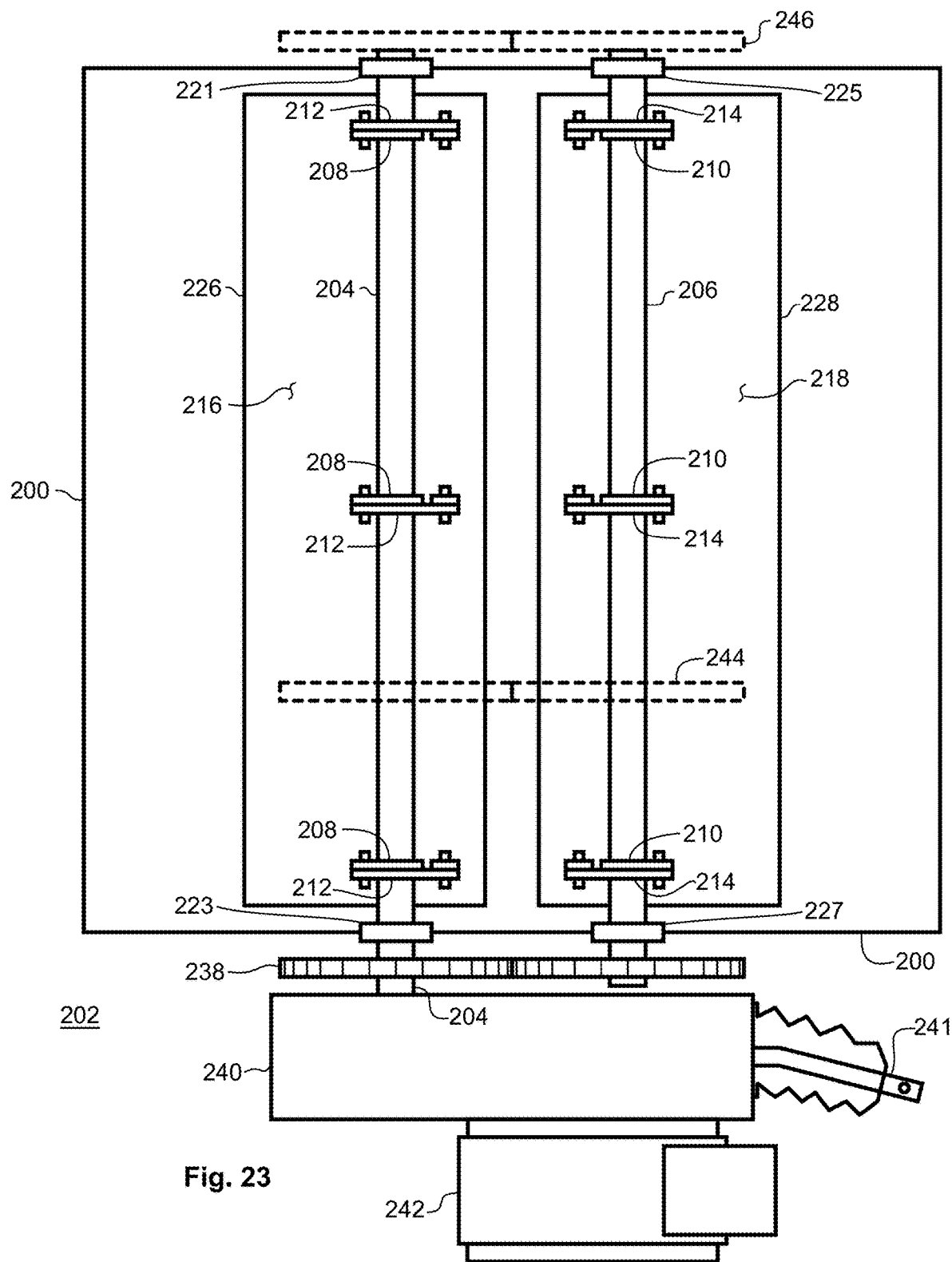
FIG. 23 is a top view drawing of a dual shaft gatebox assembly according to an illustrative embodiment of the present invention.

Reference is directed to FIG. 23, which is a top view drawing of a dual shaft gatebox assembly 202 according to an illustrative embodiment of the present invention. The mounting flange 200 is presented with the two openings 226, 228 formed through the assembly 202, and which are closed by gates 216, 218 in this view. The first drive shaft 204 is rotatable supported by end bearing/seals 221, 223. Likewise, the second drive shaft 206 is rotatable supported by end bearing/seals 225, 227. The first drive shaft 204 has three cranks arms 208 fixed to rotate therewith, and which are coupled to three connecting links 212, which are in-turn coupled to the first gate 216. Likewise, the second drive shaft 206 has three cranks arms 210 fixed to rotate therewith, and which are coupled to three connecting links 214, which are in-turn coupled to the second gate 218. This is a counter-rotation embodiment. A shaft synchronizer 238 is coupled to both the first drive shaft 204 and the second drive shaft 206, and functions to urge them in counter-rotation fashion. The first drive shaft 204 extends through the shaft synchronizer and further coupled to the output of a transmission 240, which is, in turn, driven by an electric motor 242. The transmission 240 also presents a clutch operating lever 241, as presented hereinbefore. Note that the shaft synchronizer 238 may be placed along the two drive shafts 204, 206 at any location. For example, it may be placed inside the assembly, as illustrate by broken lines 244. The shaft synchronizer may also be placed at the opposite end of the assembly, as illustrated by broken lines 246

Figure 24:
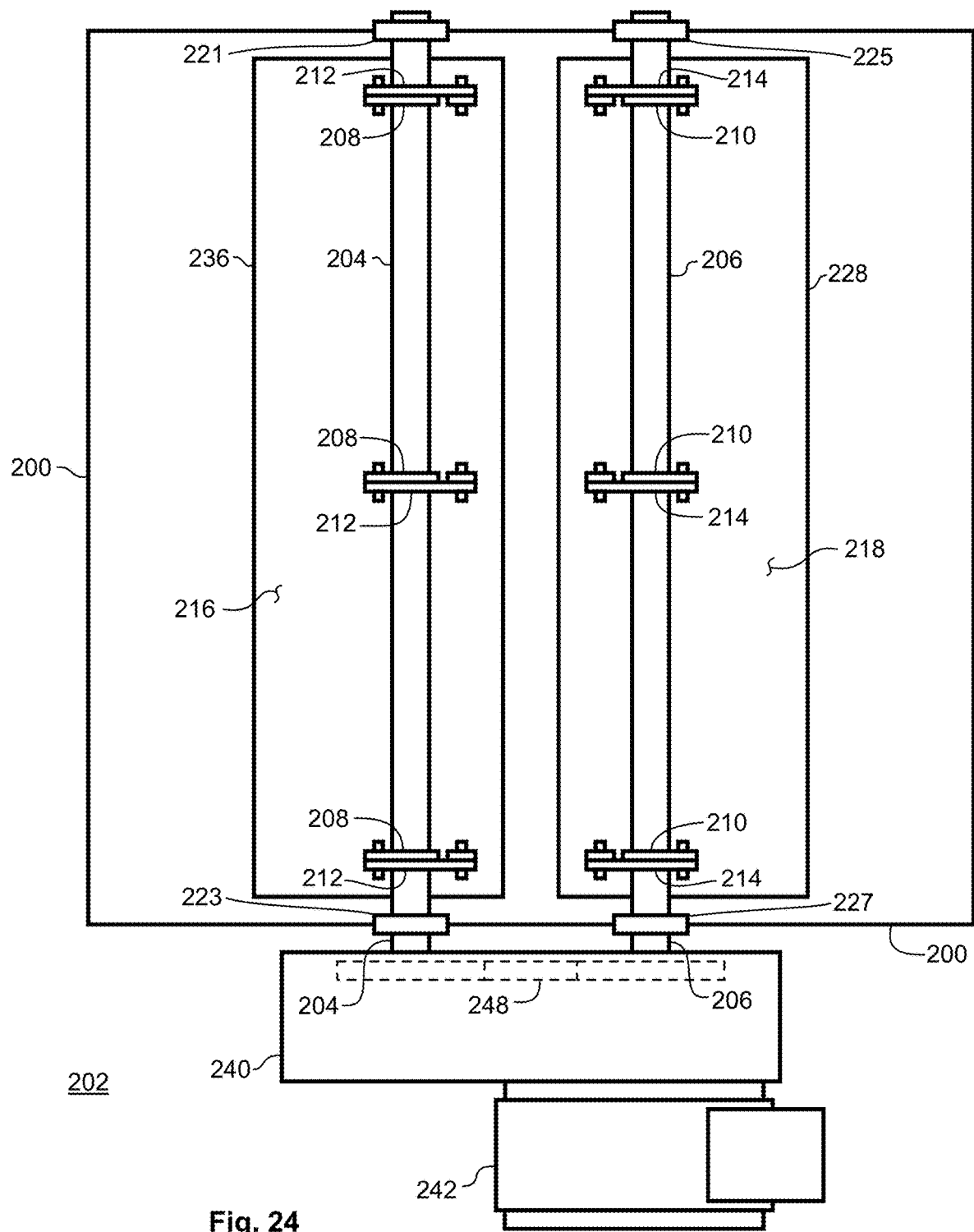
FIG. 24 is a top view drawing of a dual shaft gatebox assembly according to an illustrative embodiment of the present invention.

Reference is directed to FIG. 24, which is a top view drawing of a dual shaft gatebox assembly 202 according to an illustrative embodiment of the present invention. FIG. 24 corresponds with FIG. 23, however, in FIG. 24, the shaft synchronizer 248 is located within the transmission 240. As such, the transmission has two outputs that are coupled to the first drive shaft 204 and second drive shaft 206, respectively.

Figure 25:
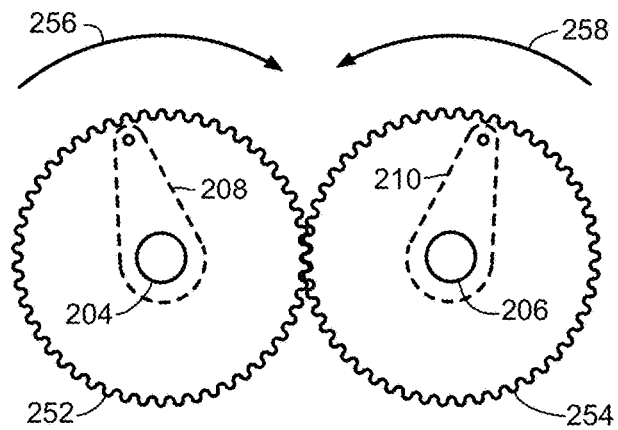
FIG. 25 is an end view drawing of a gear-coupled shaft synchronizer according to an illustrative embodiment of the present invention.

Reference is directed to FIG. 25, which is an end view drawing of a gear coupled shaft synchronizer 250 according to an illustrative embodiment of the present invention. The first and second drive shafts 204, 206 are presented with their respective crank arms 208, 210, for reference. A first spur gear 252 is fixed to the first drives shaft 204, and a second spur gear 254 is fixed to the second drive shaft 206. The spur gears 252, 254 are arranged to mesh with one another and thusly induce counter-rotation 256, 258 of the drive shafts 204, 206 with respect to one anther. Either shaft may be driven by the transmission, which will induce counter rotation in either case.

Figure 26:
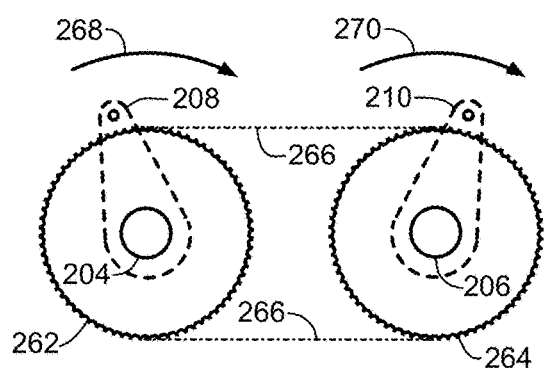
FIG. 26 is an end view drawing of a belt or chain coupled shaft synchronizer according to an illustrative embodiment of the present invention.

Reference is directed to FIG. 26, which is an end view drawing of a belt or chain coupled shaft synchronizer 260 according to an illustrative embodiment of the present invention. The first and second drive shafts 204, 206 are presented with their respective crank arms 208, 210, for reference. A first cogged belt sheave, or a first sprocket, 262 is fixed to the first drive shaft 204. And, a second cogged belt sheave, or a second sprocket, 264 is fixed to the second drive shaft 206. A timing belt, or a roller chain, 266 is routed about the sheaves/sprockets to synchronize their rotation in a common-rotation 268, 270 fashion. Either shaft may be driven by the transmission, which will induce common-rotation in either case.

Figure 27:
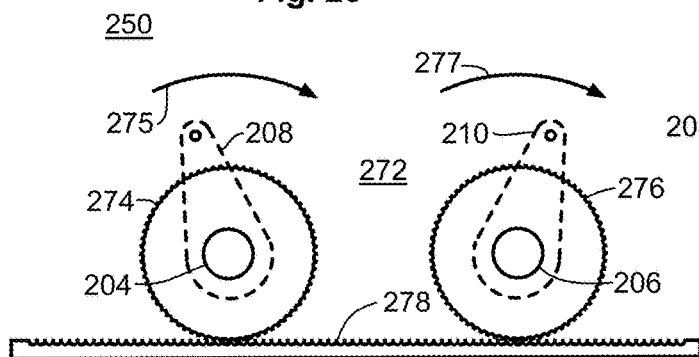
FIG. 27 is an end view drawing of a pinion-gear and geared-rack type shaft synchronizer according to an illustrative embodiment of the present invention.

Reference is directed to FIG. 27, which is an end view drawing of a pinion gear and geared-rack type shaft synchronizer 272 according to an illustrative embodiment of the present invention. The first and second drive shafts 204, 206 are presented with their respective crank arms 208, 210, for reference. A first pinion gear 274 is fixed to the first drives shaft 204, and a second pinion gear 276 is fixed to the second drive shaft 206. The pinion gears 274, 276 are arranged to mesh with a geared-rack 278, which is slidable retained in place, to thusly induce common-rotation 275, 277 of the drive shafts 204, 206 with respect to one anther. Either shaft may be driven by the transmission, which will induce common rotation in either case.

Figure 28:
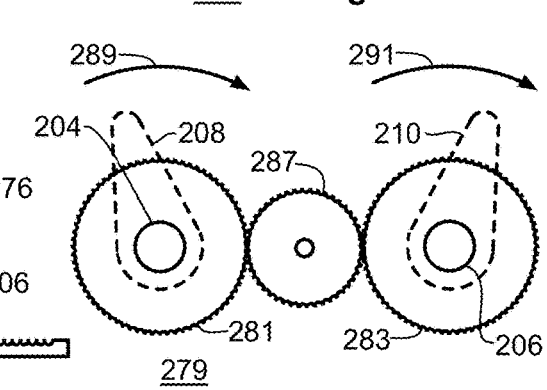
FIG. 28 is an end view drawing of a gear-coupled shaft synchronizer employing and idler gear according to an illustrative embodiment of the present invention.

Reference is directed to FIG. 28, which is an end view drawing of a gear coupled shaft synchronizer 279 employing an idler gear 2897 according to an illustrative embodiment of the present invention. The first and second drive shafts 204, 206 are presented with their respective crank arms 208, 210, for reference. A first spur gear 281 is fixed to the first drives shaft 204, and a second spur gear 283 is fixed to the second drive shaft 206. The spur gears 281, 283 are arranged to mesh with and idler gear 287 disposed therebetween, and thusly induce common-rotation 289, 291 of the drive shafts 204, 206 with respect to one anther. Either shaft 204, 206, or the idler gear 287, may be driven by the transmission, which will induce common-rotation in either case.

Figure 29:
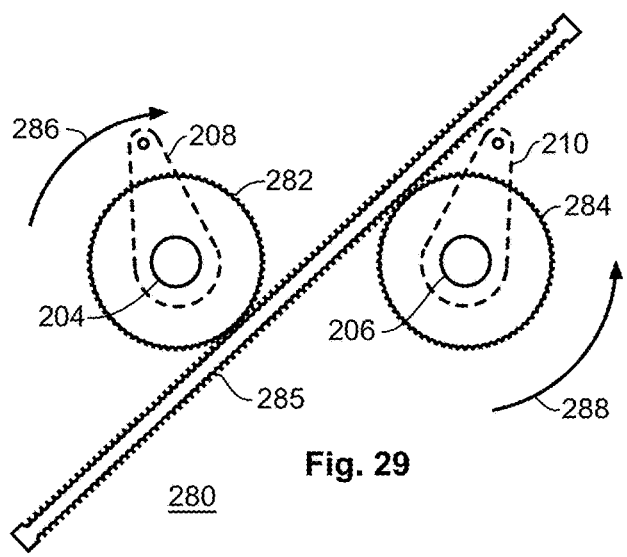
FIG. 29 is an end view drawing of a pinion-gear and geared-rack type shaft synchronizer according to an illustrative embodiment of the present invention.

Reference is directed to FIG. 29, which is an end view drawing of another pinion gear and geared-rack type shaft synchronizer 280 according to an illustrative embodiment of the present invention. The first and second drive shafts 204, 206 are presented with their respective crank arms 208, 210, for reference. A first pinion gear 282 is fixed to the first drives shaft 204, and a second pinion gear 284 is fixed to the second drive shaft 206. The pinion gears 282, 284 are arranged to mesh with a dual sided geared-rack 285, which is slidable retained in place along a diagonal path between the pinion gears 282. 284, to thusly induce counter-rotation 286, 288 of the drive shafts 204, 206 with respect to one anther. Either shaft may be driven by the transmission, which will induce common rotation in either case.

Figure 30:
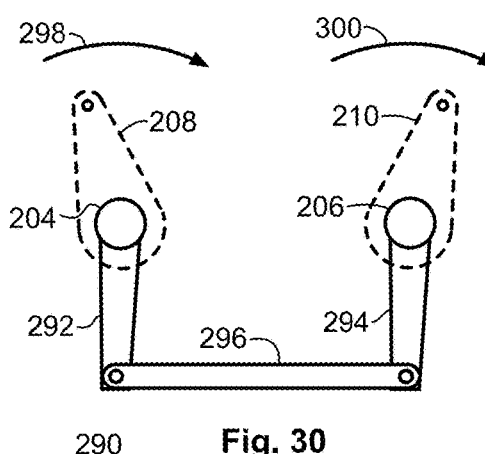
FIG. 30 is an end view drawing of a crank arm type shaft synchronizer according to an illustrative embodiment of the present invention.

Reference is directed to FIG. 30, which is an end view drawing of a crank arm type shaft synchronizer 290 according to an illustrative embodiment of the present invention. The first and second drive shafts 204, 206 are presented with their respective crank arms 208, 210, for reference. A first crank arm 292 is fixed to the first drives shaft 204, and a second crank arm 294 is fixed to the second drive shaft 206. The crank arms 292, 294 are coupled together by a connecting link 296, to thusly induce common-rotation 298, 300 of the drive shafts 204, 206 with respect to one anther. Either shaft may be driven by the transmission, which will induce counter rotation in either case. With this embodiment, shaft rotation is limited to somewhat less than one hundred eighty degrees.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A gatebox system for a hopper that contains fluid in a firefighting aircraft, comprising:
   a box assembly that receives the fluid from the hopper, having first and second gate openings formed through a lower portion thereof;
   first and second gates hingedly connected along respective edges of said first and second gate openings;
   first and second drive shafts, rotatably supported within said box assembly;
   first and second crank arms fixed to said first and second drive shafts, respectively, and coupled to said first and second gates by first and second connecting links, respectively;
   a shaft synchronizer engaged with said first and second drive shafts to synchronize rotation thereof in respective gate-opening and gate-closing directions, and having an input coupler;
   an electric motor coupled to said input coupler to urge rotation thereof, and wherein
   rotation of said input coupler induces synchronized rotation, through said shaft synchronizer, of both of said first and second drive shafts in said respective gates-opening and gates-closing directions, and wherein said synchronized rotation is thereby coupled to said first and second gates by said first and second crank arms and said first and second connecting links to open and close said first and second gates, and to thereby enable control of the fluid flow from the hopper according to angular positions of said input coupler.

2. The gatebox system of claim 1, and wherein:
   said first and second crank arms and said first and second connecting links are arranged to define an over-center geometry while said first and second gates are at closed positions, such that weight of the fluid on said first and second gates induces torque on said first and second drive shafts in said respective gates-closing directions.

3. The apparatus if claim 1, and wherein:
   said input coupler includes a portion of said first drive shaft, and wherein
   said motor is coupled to said portion of said first drive shaft.

4. The apparatus if claim 1, and wherein:
   said shaft synchronizer includes first and second gears meshingly engaged with one another, and each coupled to said first or second drive shafts, respectively.

5. The apparatus if claim 1, and wherein:
   said shaft synchronizer comprises drive components selected from; a pair of meshed gears, a pair of gears meshed with a common idler gear, a pair of sheaves coupled with a timing belt, a pair of sprockets coupled by a roller chain, a pair of gears coupled by a geared rack, and a pair of crank arms coupled by a connecting link.

6. The gatebox system of claim 1, and wherein
   said first and second connecting links engage said first and second drive shafts while said first and second gates are at said closed positions to thereby prevent over-rotation of said first and second drive shafts in said respective gates-closing directions.

7. The gatebox system of claim 1, and wherein:
said first crank arm and said first connecting link further comprise plural crank arms and plural connecting links disposed between said first drive shaft and said first gate, and
said second crank arm and said second connecting link further comprise plural crank arms and plural connecting links disposed between said second drive shaft and said second gate.

8. The gatebox system of claim 1, and wherein:
said first and second crank arms and said first and second connecting links are configured with a geometry such that said first gate and said second gate open out of phase with one another as said first and second drive shafts are rotated in said gate-opening direction.

9. The gatebox system of claim 1, and further comprising:
a transmission coupled between said electric motor and said input coupler, to thereby increase the available torque to drive said first and second drive shafts in both of said respective gates-opening and gates-closing directions.

10. The gatebox system of claim 9, and wherein:
said transmission is coupled through a clutch operable to selectively disconnect said input coupler therefrom.

11. The gatebox system of claim 1, further comprising:
a servo-motor controlled by a serve-motor controller, and coupled to said input coupler to thereby drive said first and second drive shafts in either of said respective gates-opening or gates-closing directions.

12. The gate box system of claim 11, and wherein:
said servo-motor is electrically arranged to function as a generator when driven by forced applied to said first and second gates, to thereby deliver regenerative electrical power back into said servo-motor controller.

13. The gatebox system of claim 11, further comprising:
manual OPEN and CLOSE actuators coupled to said servo-motor controller, to thereby enable manually selectable operation of said first and second gates between open and closed positions.

14. The gatebox system of claim 11, further comprising:
a control system coupled to said servo-motor controller to control the angular positions of said first and second drive shafts, and thereby control of the flow of fluid through said first and second gates.

15. The gatebox system of claim 14, and further comprising;
a position sensor coupled to said input coupler that outputs a gate position signal to said control system;
a current sensor coupled to said servo motor that outputs a motor current signal to said control system, and wherein
said control system defines a gates-closed position of said first and second gates upon receipt of said position signal that indicates a closed condition and upon receipt of said motor current signal that exceeds a predetermined current threshold.

16. The gatebox system of claim 15, and wherein:
said control system controls the flow of fluid from said first and second gates by counting the number of revolutions of said servo-motor.

17. The gatebox system of claim 1, and further comprising:
a transmission coupled between said electric motor and said input coupler to thereby rotate said first and second drive shafts in either of said respective gates-opening and gates-closing directions under motive force of said motor;
a clutch coupled to selectively disconnect said transmission from said input coupler;
a manual actuator coupled to said clutch to selectively disconnect said transmission from said input coupler, and thereby enable said first and second gates to open without use of said motor.

18. The gatebox system of claim 17, further comprising:
a clutch linkage disposed between said manual actuator and said clutch, and wherein
said clutch linkage is coupled to said input coupler through a shaft crank arm, and wherein
actuation of said manual actuator applies rotational force to said input coupler, through said shaft crank arm, in said gates-opening directions, to thereby rotate said first and second drive shafts past their said respective over-center conditions to enable said first and second gates to fall open under force of gravity.

19. The gatebox system of claim 18, and wherein:
said clutch linkage is configured to disengage said clutch prior to applying rotational force to said input coupler.

20. The gatebox system of claim 18, further comprising:
an interlock coupled between said clutch linkage and said motor, and operable to disable electric power to said motor upon actuation of said manual actuator.

* * * * *